(12) United States Patent
Geist et al.

(10) Patent No.: US 11,745,296 B2
(45) Date of Patent: Sep. 5, 2023

(54) MILLING TOOL AND PRODUCTION METHOD FOR A MILLING TOOL

(71) Applicant: Franken GmbH & Co. KG Fabrik für Präzisionswerkzeuge, Ruckersdorf (DE)

(72) Inventors: Reinhard Geist, Lauf (DE); Matthieu Favre, Reichenschwand (DE); Helmut Glimpel, Lauf (DE)

(73) Assignee: FRANKEN GMBH & CO. KG FABRIK FÜR PRÄZISIONSWERKZEUGE, Rückersdorf (DE)

( * ) Notice: Subject to any disclaimer, the term of this patent is extended or adjusted under 35 U.S.C. 154(b) by 959 days.

(21) Appl. No.: 16/477,274

(22) PCT Filed: Jan. 30, 2018

(86) PCT No.: PCT/EP2018/052208
§ 371 (c)(1),
(2) Date: Jul. 11, 2019

(87) PCT Pub. No.: WO2018/145944
PCT Pub. Date: Aug. 16, 2018

(65) Prior Publication Data
US 2021/0129274 A1 May 6, 2021

(30) Foreign Application Priority Data
Feb. 8, 2017 (DE) .......... 10 2017 102 473

(51) Int. Cl.
*B23P 15/34* (2006.01)
*B23C 5/10* (2006.01)

(52) U.S. Cl.
CPC ............ *B23P 15/34* (2013.01); *B23C 5/10* (2013.01); *B23C 2210/241* (2013.01);
(Continued)

(58) Field of Classification Search
CPC ........ B23C 2210/241; B23C 2210/242; B23C 2210/40; B23C 5/10; B23C 5/14;
(Continued)

(56) References Cited

U.S. PATENT DOCUMENTS

| 2,218,637 A | 10/1940 | Carr |
| 3,678,554 A | 7/1972 | Ezhov et al. |

(Continued)

FOREIGN PATENT DOCUMENTS

| CN | 101972870 A | 2/2011 |
| CN | 101983811 A | 3/2011 |

(Continued)

OTHER PUBLICATIONS

International Search Report dated May 3, 2018 from International Patent Application No. PCT/EP2018/05228 filed Jan. 30, 2018.
(Continued)

*Primary Examiner* — Sara Addisu
(74) *Attorney, Agent, or Firm* — Workman Nydegger

(57) ABSTRACT

A milling tool having an operating area that is rotatable about an operating axis of rotation for milling a workpiece. The operating area has at least one milling edge extending transversely to the circumferential direction (U) of an operating axis of rotation. At least one of the at least one milling edge includes at least one milling edge portion in which a milling edge profile (P), which is defined by the radial distance (F) between the milling edge and the operating axis of rotation along the milling edge, has a non linear progression. The milling edge in the milling edge portion has a chip space, which extends radially inward toward the operating axis of rotation in relation to the milling edge. The chip space has a chip space base that follows the milling edge profile (P) at least in portions in the milling edge portion with the non-linear milling edge profile (P).

24 Claims, 10 Drawing Sheets

(52) U.S. Cl.
CPC .... *B23C 2210/242* (2013.01); *B23C 2210/40* (2013.01); *B23C 2220/366* (2013.01)

(58) Field of Classification Search
CPC ....... B23C 2220/366; B23C 5/12; B23C 5/18; B23C 2210/247; B23C 2210/285; B23P 15/34

See application file for complete search history.

(56) References Cited

U.S. PATENT DOCUMENTS

| | | | |
|---|---|---|---|
| 4,243,348 | A | 1/1981 | Paige |
| 5,908,269 | A | 6/1999 | Cox |
| 6,186,199 | B1 | 2/2001 | Gittel et al. |
| 6,322,296 | B1 | 11/2001 | Wetli et al. |
| 8,511,949 | B2 * | 8/2013 | Itoh ............ B23C 3/34 407/53 |
| 8,696,408 | B2 * | 4/2014 | Shimizu ........ B23P 15/34 451/48 |
| 9,616,505 | B2 * | 4/2017 | Haimer ........ B23C 5/10 |
| 9,630,267 | B2 * | 4/2017 | Glimpel ........ B23G 7/02 |
| 9,724,773 | B2 * | 8/2017 | Glimpel ........ B23G 7/02 |
| 2011/0312253 | A1 | 12/2011 | Shimizu et al. |
| 2014/0301796 | A1* | 10/2014 | Glimpel ........ B23G 5/06 408/1 R |
| 2015/0125229 | A1* | 5/2015 | Glimpel ........ B23G 5/04 408/1 R |
| 2015/0251253 | A1* | 9/2015 | Hufschmied ...... B23C 5/10 407/29.13 |
| 2016/0332239 | A1 | 11/2016 | Fromerth et al. |

FOREIGN PATENT DOCUMENTS

| | | | | |
|---|---|---|---|---|
| CN | 105149668 A | | 12/2015 | |
| CN | 102933350 A | | 9/2020 | |
| DE | 579903 C | | 7/1933 | |
| DE | 19855045 A1 | | 6/2000 | |
| DE | 102007055842 A1 | * | 11/2008 | ............... B23C 3/30 |
| JP | 2002233910 A | * | 8/2002 | ............... B23C 5/10 |
| JP | 2008279547 A | * | 11/2008 | ............... B23C 3/30 |
| KR | 10-2013-0021396 A | | 3/2013 | |
| SU | 984720 | | 12/1982 | |
| SU | 322030 | | 6/1983 | |
| SU | 1316756 | | 6/1987 | |
| WO | 2010/023760 A1 | | 3/2010 | |
| WO | 2013004568 A1 | | 1/2013 | |
| WO | WO-2016042646 A1 | * | 3/2016 | ............ B23B 29/02 |
| WO | 2016158664 | | 10/2016 | |

OTHER PUBLICATIONS

Office Action received for EP Application No. 18702660, dated Nov. 4, 2021, 5 pages.
First Office Action for Chinese Application No. 201880004311.1, dated Sep. 1, 2020, 16 pages (10 Pages of English Translation and 6 Pages of Original Document).
Russian Search Report with English translation, dated Jan. 13, 2020, for PCT / EP2018 / 052208 application filed on Jan. 30, 2018.
Extract of Japanese OA from JP2019-519675, Aug. 21, 2020.
Office Action received for Korean Application No. 10-2019-7013815, dated Jan. 6, 2021, 7 pages (1 page of English Translation and 6 pages of Original Document).
Office Action for Japanese patent application No. 2019519675 dated Dec. 24, 2019.

* cited by examiner

MILLING TOOL AND PRODUCTION METHOD FOR A MILLING TOOL

CROSS-REFERENCE TO RELATED APPLICATIONS

The present invention is a 35 U.S.C. § 371 U.S. National Stage of PCT Application No. PCT/EP2018/052208, filed on Jan. 30, 2018, which claims priority to German Patent Application No. DE 10 2017 102 473.5, filed Feb. 8, 2017. The entire content of each of the aforementioned patent applications is incorporated herein by reference.

BACKGROUND OF THE INVENTION

1. Field of the Invention

The invention relates in particular to a milling tool such as, for example, an end mill, a finishing cutter, in particular a fir tree cutter, and to a production method for a milling tool.

2. Background

End mills such as, for example, finishing cutters, in particular with a fir tree cutting profile, i.e. so-called fir tree cutters, are provided for removing surface material from a workpiece surface and are moved for this purpose in a milling movement relative to the workpiece surface with the end mill rotated about the operating axis of rotation or the tool axis thereof with simultaneous feeding.

As a rule, end mills comprise a, for example elongated, substantially cylindrical shank along the operating axis of rotation and a machining head which connects thereto, on the lateral surface of which protrude milling cutters (in particular also: milling edges), for example circumferential milling cutters and, where applicable, end face milling cutters located at the front. A clamping area for clamping in a tool holder of a power tool is provided, as a rule, on the area of the shank adjacent to the machining head.

In order to enable surface material removal, the circumferential milling cutters or edges can extend over a certain length transversely to the circumferential direction of the operating axis of rotation continuously and without interruption on a lateral surface, which is rotationally symmetrical about the operating axis of rotation and is, as a rule, cylindrical, such that they are able to engage in the workpiece surface at an engagement depth, which is radial to the tool axis, substantially over their entire axial length.

The axial length of the milling cutters, in this case, is clearly greater, as a rule greater by at least a factor of between 5 and 10, than the radial engagement depth. The circumferential milling cutters are certainly also able to extend in a straight line parallel to the tool axis but are realized, as a rule, helically or so as to extend in a twisted manner at an angle of twist about the tool axis.

The discontinuous cutting of the milling cutters characteristic of the milling process, which causes chips of the workpiece to be removed via the surface, is effected as a result of the milling movement.

To produce high quality surfaces, or high levels of surface quality for example when finish cutting, along with the precision of the milling tool the smoothness of the respectively used milling tool is also important. In particular, it is advantageous for this purpose when the geometry and the design of the milling tool, in particular of the machining head, are realized in such a manner that oscillations and vibrations during the milling operation, which is carried out, as a rule, at comparatively high speeds, are avoided.

Apart from this, it is generally desirable in the case of milling tools that the machining area, in particular the machining head, is realized such that a best possible tool life is achieved.

BRIEF SUMMARY OF THE INVENTION

Accordingly, it is the object of the invention to provide a tool, in particular an end mill, a finishing cutter, in particular a fir tree cutter, and a corresponding production method by way of which comparatively high surface quality can be achieved with milling tools, and where, for example, a comparatively long tool life, in particular connected with reduced risk of breakage of the milling edge, is able to be achieved.

This object is achieved by the features of the independent claims. These embodiments result from the dependent claims and from the following description of exemplary embodiments of the invention.

The features and feature combinations described herein according to the underlying invention are not limited by the feature combination/s chosen in the claims and the chosen dependencies. Each feature in the patent claims is able to be claimed, also independently of the respective claim dependency, in an arbitrary combination with one feature or multiple other features of the claims or of the following description. In addition, each feature which is disclosed in the following description and/or in the accompanying drawings and/or is described or disclosed in connection with the drawings, can be claimed per se, independently or detached from the context in which it stands, on its own or in any combination with one or multiple other features which is or are described or disclosed in the claims, the description and/or the drawings, in particular to the extent that the respective feature at least supplies a contribution to the achievement of the underlying object. In particular, each of the embodiments described below or each of the described exemplary embodiments and the features thereof can be claimed separately per se and/or in arbitrary combinations.

In one embodiment of the invention, in particular according to claim 1, a milling tool is provided which can be realized, for example, as an end mill, a finishing cutter, as a fir tree cutter or as a bore milling cutter.

In the case of a fir tree cutter, the milling edges in the machining head are realized in such a manner that they comprise a fir tree-shaped milling edge profile (in particular also: a fir tree-shaped milling contour) so that fir tree-shaped milling structures may be produced on workpieces. Corresponding milling structures can comprise, for example, multiple peaks and troughs having varying heights or depths relative to the workpiece surface.

For example, a fir tree cutter can comprise multiple milling edges which extend with a preferred direction along the tool axis, i.e. operating axis of rotation, and in particular extend transversely to the circumferential direction of the operating axis of rotation, each milling edge being able to comprise multiple peaks and troughs which realize a fir tree structure when viewed in the milling profile.

The proposed milling tool is rotatable about an operating axis of rotation (in particular also: tool axis), in particular in such a manner that a milling profile, which corresponds to the milling edge profile of the operating area, is able to be generated on a workpiece.

The operating area can comprise at least one, preferably multiple, milling edges which extend transversely to the circumferential direction of the operating axis of rotation. In other words, the operating area can comprise at least one, preferably multiple, milling edges, each milling edge being able to be aligned, when viewed locally parallel to its longitudinal extension, transversely to the circumferential direction defined with reference to the operating axis of rotation.

The milling edge/edges, which extend transversely to the operating axis of rotation, can extend with respect to the longitudinal axis (in particular: tool axis) in portions for example perpendicularly or helically, for example at a predefined angle, in particular an angle of twist.

At least one of the at least one milling edge of the proposed milling tool comprises at least one milling edge portion in which a milling edge profile, which is defined by the radial distance between the milling edge and the operating axis of rotation, i.e. by the milling edge radius of the milling edge, along the milling edge, comprises a non-linear progression. In other words, at least one, in embodiments each one, of the at least one milling edge comprises a milling edge profile which shows a progression that is different to a linear progression in at least one milling edge portion, which can be defined, for example, by a predefined longitudinal extension over the operating area.

Further, it is provided that the milling edge in the milling edge portion has assigned thereto a chip space, which extends (in particular also: is recessed) radially inward toward the operating axis of rotation in relation to the milling edge. The chip space can be defined, for example, as a space which is recessed locally in relation to the milling edge or as a space which extends radially inward toward the operating axis of rotation from the milling edge, with, for example, a predefined width or predefined width progression in the circumferential direction, or cross section.

The chip space can comprise, for example in sections perpendicularly to the milling edge, a predefined chip space profile which can be realized in a constant or variable manner in the progression along the milling edge. The chip space profile can be realized, in particular in the macros structure thereof, for example, in the manner of a radially outwardly open U or V form.

The chip space can be realized as a chip space which is realized radially inwardly, i.e. toward the operating axis of rotation, with reference to the milling edge, in particular as a chip space which connects radially inwardly, i.e. toward the operating axis of rotation, to the milling edge in the milling edge portion, for example as a chip space which is recessed radially with respect to the milling edge.

The chip space comprises a chip space base, and the chip space is realized in such a manner that the chip space base follows the milling edge profile at least in portions in the milling edge portion with the non-linear progression, in particular along the length of the milling edge portion comprising the non-linear progression. In particular, in one milling edge portion which includes a non-linear milling edge profile portion, the progression of the chip space base can follow the progression of the milling edge profile at least in portions.

By the chip space base following the milling edge in the profile at least in portions, for example extending parallel to the milling edge in portions or extending substantially parallel to the milling edge, it is possible to achieve that at least locally improved strength and tool life for the milling edge and, where applicable, any cutting teeth realized are achieved.

As mentioned, it may be provided that the chip space base follows the milling edge profile in the progression along the milling edge. The chip space base can comprise, in particular, a profile, i.e. a chip space base profile, which follows the milling edge profile, in particular corresponds to the milling edge profile and/or is congruent with the same and/or, in particular in the progression along the milling edge, follows the milling edge profile in the or with reference to the radial direction or extends in the progression along the milling edge perpendicularly to the milling edge or, when viewed radially with reference to the operating axis of operation, substantially equidistantly to the milling edge profile and/or to the envelope of the milling edge and/or to the milling edge. In particular, the distance measured perpendicularly to the milling edge between milling edge and chip space base can be substantially constant at least in portions in the progression along the milling edge. In addition, it is possible for the radial distance, measured with reference to the operating axis of rotation, between milling edge and chip space base to be substantially constant at least in portions.

Milling edge profile and chip space base profile can extend, for example, substantially parallel to one another in the progression along the milling edge in the milling edge portion, in particular with reference to the rough structure, for example the envelope, of the milling edge profile.

It can be provided, in particular, that the milling edge portion includes substantially the entire milling edge, or that the milling edge portion of a milling edge extends over the entire length of the milling edge. For example, the chip space can be realized such that the chip space base follows the milling edge profile in the progression along the entire milling edge. A milling edge portion of a milling edge, when viewed in the longitudinal extension of the milling edge, can, however, also just refer to one part of the entire milling edge.

In embodiments it can be provided, as already mentioned, that a radial distance or a distance, measured perpendicularly to the milling edge, between chip space base and milling edge is constant in the progression along the milling edge, or that a chip surface realized between chip space base and milling edge, when measured transversely to the milling edge, comprises a substantially constant width, in particular average width, in the progression along the milling edge in the milling edge portion.

The term chip space is to be understood, in particular, as a space which is connected upstream of the milling edge in the operating direction of rotation, is offset radially inwardly with respect to the milling edge, for example in the form of a groove, and is realized, in particular, for receiving and/or forming the milling material, for example chip material, generated during milling engagement.

The term chip space base can be understood, for example, as a line or surface extending in the chip space which is at the smallest radial distance to the operating axis of rotation in each case locally in the progression along the milling edge. The term chip space base can be understood, for example, as a root line or root surface which is realized in the area of the bottom of the chip space, the intersection between two chip surfaces of the chip space, for example, being possible as the root line.

The non-linear progression of the milling edge profile realized in the milling edge portion of the at least one milling edge, and of the corresponding chip space base profile can be provided, for example, as a result of a milling edge radius, or chip space base radius, which corresponds to the radial distance between the milling edge or the chip space base and the operating axis of rotation, initially increasing in the milling edge portion along the milling edge and then decreasing again and/or that the milling edge profile/chip space base profile, comprises, from a geometrical point of view, at least one turning point, one extreme position and/or one point of discontinuity in its derivative or gradient, for example a kink, in the milling edge portion.

In embodiments, the milling edge and the chip space base can be realized in such a manner that a chip surface realized between milling edge and chip space base in the milling edge portion comprises a substantially constant width, measured in particular perpendicularly to the milling edge, in the progression along the milling edge.

It may be provided in embodiments that a radial distance or a distance measured perpendicularly to the milling edge between milling edge and chip space base in the progression along the milling edge, i.e. locally along the milling edge, is substantially constant or non-varying at least within the milling edge portion, preferably over the entire milling edge.

It may be provided in embodiments that the milling edge profile is realized in such a manner that an, in particular local or locally averaged, milling edge radius, measured with reference to the operating axis of rotation, initially increases and then decreases again along the milling edge, i.e. in the progression along the milling edge.

The term milling edge radius may be understood, in particular, as the local distance, measured in the radial direction, between milling edge and operating axis of rotation. The milling edge profile, which can reproduce, for example, the variation in the milling edge radius in dependence on the axial length along the operating axis of rotation, is produced from the progression of the milling edge radius along the milling edge.

In embodiments, the milling edge profile, from a geometrical point of view, may comprise at least one turning point, one extreme position and/or one point of discontinuity in its derivative or gradient, at least within the milling edge portion.

In embodiments, the milling edge profile can be realized in such a manner that a radial distance or a distance measured perpendicularly to the milling edge between milling edge and chip space base is substantially constant along the milling edge at least within the milling edge portion.

The milling edge profile can be realized in particular in such a manner that a chip surface, realized between chip surface base and milling edge in the milling edge portion, comprises a substantially constant width, measured in particular radially or perpendicularly to the milling edge, in the progression along the milling edge.

The at least one milling edge portion is realized in particular in such a manner that the milling edge radius along the milling edge, i.e. in the progression along the milling edge or in the longitudinal progression, is not constant but varied, for example continuously and/or discontinuously such that the milling edge profile, defined by the milling edge radius, in at least one milling edge portion in the longitudinal direction of the milling edge, i.e. in the progression along the milling edge, shows a non-linear progression as described in more detail, for example, further above, for example initially increasing and then decreasing again.

The milling edge portion may include, for example, a peak or a trough, a point, a prong, or a notch and the like, or can include such a structure at least in portions, in such a manner that the associated milling edge profile shows the non-linear progression. Correspondingly, the chip space base can comprise a chip space base profile which comprises, corresponding to the milling edge, i.e. following the milling edge, a peak or a trough, a point, a prong, or a notch and the like, or comprises such a structure at least in portions.

The milling edge can be, for example, a continuous, in particular smooth milling edge. However, the invention is also applicable to discontinuous milling edges, i.e. milling edges with roughing toothing and the like. In the case of discontinuous milling edges, the envelope of the respective maximum milling edge radii can be used as a milling edge profile. As an alternative to this, the locally averaged milling edge radius as milling edge profile can become a milling edge profile. In particular, the term milling edge profile can be understood as the radial progression of the milling edge without considering possible, for example local, fine structuring of the milling edge, such as, for example, roughing toothing, in other words the radial progression of the rough structure of the milling edge.

The wording "following the milling edge profile" is to be understood, in particular, as the profile of the chip space base, apart from discontinuous milling edge structures, in particular fine structuring such as, for example, roughing toothing, is substantially congruent with the milling edge profile. In particular, when viewed in the longitudinal direction of the milling edge, the radial progression of the chip space base, i.e. the chip space base profile, can follow or correspond to the radial progression of the milling edge, i.e. the milling edge profile. Correspondingly, as already mentioned, geometric forms of the milling edge can be imaged or realized in a corresponding manner, and in a substantially congruent manner, in the chip space base.

The chip space base can be defined, for example, by a substantially smooth surface or line, irrespective of whether the milling edge is realized, for example, continuously or discontinuously. In particular, the wording "following the milling edge profile" can be understood as "following apart from discontinuous fine structuring" or as "congruent apart from discontinuous fine structuring".

However, in cases where the milling edge comprises a discontinuous fine structuring, for example roughing toothing, the chip space base comprising a structure which corresponds to the fine structuring of the milling edge should not be ruled out.

The milling tool can therefore comprise, for example, a milling edge with a smooth structure (in particular also: a continuous structure) which comprises a milling edge profile with a non-linear progression in the at least one milling edge portion, the chip space base also comprising a smooth structure and following the milling edge profile. In addition, it is possible for the milling edge to comprise a fine structure (in particular also: a discontinuous structure) and to comprise a milling edge profile with a non-linear progression in the at least one milling edge portion, it being possible for the chip space base following the milling edge profile to comprise a continuous structure, in particular a smooth structure, or a discontinuous structure.

The at least one milling edge can comprise multiple of the named milling edge portions. Between 2 and 10, in particular between 2 and 5 of the milling edge portions can be present, for example, over the axial length of the machining head. The rough structure of consecutive milling edge portions can be realized alternately as peaks and troughs, for example in the manner of a fir tree structure. It must be mentioned, at this point, in particular, that the invention described herein is suitable especially for so-called fir tree milling cutters, the milling edge profile of which resembles a fir tree structure.

It may be provided in embodiments that the milling tool, in particular a basic body of the milling tool, comprises an overall pagoda-shaped profile, wherein milling edges, realized on the pagoda-shaped profile, may comprise chip spaces which are mounted upstream in the circumferential direction and which are defined as herein, where the chip space base follows the milling edge profile. For example, the milling tool can be realized in such a manner that in the case of at least one, preferably in the case of all milling edges, the respective milling edge profile and chip space base profile, in particular in milling edge portions which include non-linear milling edge profile portions, substantially correspond to one another, for example are congruent with one another.

A milling edge portion may include multiple sub-portions which may be curved for example convexly or concavely with reference to the operating axis of rotation or may comprise a linear progression. In particular, multiple sub-portions with a curved or linear progression may be combined in accordance with the respectively desired milling profile.

The milling edge may comprise a predefined twisting progression or helical progression with reference to the operating axis of rotation, for example at a predefined, in particular constant, angle of twist. However, it may also be provided in embodiments that the angle of twist changes along a milling edge, for example varies according to a predefined pattern.

The angle or angles of twist of the milling edge or edges may be chosen in embodiments in particular in such a manner that when used correctly in the milling operation, at least one milling edge always engages the workpiece at least in portions, for example a milling tooth, in the respective operating area in which the milling tool is in contact with the workpiece to be machined.

The chip space can extend with reference to the operating axis of rotation over a predefined rotation angle which is non-varying in particular in the progression along the chip space. In variants, the chip space may comprise a width which is measured with reference to the operating axis of rotation in the circumferential direction and is substantially constant in the progression along the chip space. For example, the chip space may be realized as a groove arranged upstream of the milling edge in the operating direction of rotation. The chip space itself may comprise a substantially constant height in the progression along the chip space following the progression of the milling profile, the height of the chip space being able to be understood as a perpendicular or radial distance between chip space base and milling edge.

The chip space may comprise a first chip surface which extends between milling edge and chip space base, and in addition may comprise at least one second chip surface which connects to the chip space base and lies opposite the first chip surface. The second chip surface, as also the first chip surface, may follow the milling edge profile and comprise a substantially non-varying width, in particular average width, in the progression along the milling edge.

The chip space may comprise, for example, a U-shaped or V-shaped form in cross section with reference to the longitudinal extension of the chip space, a first leg being able to be realized between milling edge and chip space base or chip space root, corresponding, for example, to the first chip surface, and a second, preferably shorter, leg, corresponding, for example, to the second chip surface, being able to connect to the chip space base or the chip space root.

With the proposed embodiment of the chip space base, the chip space can be realized, in particular, in such a manner that, for example, the chip surface assigned to the milling edge, in particular the chip surface connecting radially inwardly to the milling edges, or also further chip surfaces, in each case comprise a substantially constant width perpendicularly to the milling edge or in the radial direction and/or in the circumferential direction in the progression along the chip space or the milling edge. In particular, substantially non-varying chip formation and chip removal can be achieved over the entire milling edge in this manner, as a result of which the milling result is able to be advantageously influenced.

The proposed realization with a chip space, the chip space base of which follows the milling edge profile, has proved to be particularly smooth running and/or vibration-resistant so that when workpieces are milled, in particular comparatively high levels of surface quality are able to be achieved. Apart from this, it is possible to achieve improved stability linked to reduced risk of breakage in particular in the area of the milling edge, and generally speaking increased tool life compared to milling cutters according to the prior art which comprise one or multiple of the above-named milling edge portions but comprise a chip space base which does not follow the milling edge profile.

As already indicated, it may be provided in embodiments that in the case of the proposed milling tool, the at least one milling edge, in a preferred manner each of the milling edges insofar as multiple milling edges are present, include multiple of the milling edge portions which are defined as herein. The multiple milling edge portions may be arranged along the respective milling edge one behind another, in particular directly one behind another.

At least one of the milling edge portions, as an option each of the milling edge portions, may be realized in embodiments as a cutting tooth which is in particular dome-shaped with reference to the operating axis of rotation. The mentioned exemplary embodiments enable, in particular, the implementation of fir tree milling cutters with a fir tree-shaped milling profile.

The cutting teeth may comprise rounded or tapered tooth tips, and tooth roots which are rounded, tapered and/or extend in a substantially rectilinear manner. For example, two adjacent cutting teeth may be connected by a milling edge portion which has a rectilinear progression in the milling edge profile. In particular, the cutting teeth and milling roots, and associated chip spaces, as well as further portions of the milling tool can be realized in the region of the machining head in such a manner that the machining head is realized in the form of a pagoda.

In embodiments, one or multiple milling edges may extend at, for example, a predefined angle of twist and at a predefined separation angle on a pagoda-shaped basic body, for example in such a manner that there is a non-varying distance measured in the radial direction or measured perpendicularly to the milling edge between milling edge and chip space base or chip space root in the progression along the milling edge. In particular, the chip surface realized between milling edge and chip space root or chip space base may comprise a non-varying width measured perpendicularly to the milling edge, i.e. the transverse extension, in particular the average transverse extension, of the chip surface, following the progression of the chip space, can be substantially constant.

In embodiments of the milling tool at least one of the at least one milling edge, in particular the milling edge profile, can be realized on a milling lug which extends at least in part over the operating area transversely to the circumferential direction. The milling lug may comprise a predefined width measured in the circumferential direction, which width can be, for example, substantially constant in the progression along the milling edge. In particular, the milling lug can be realized as a web which extends at a predefined angle of twist, with a predefined, in particular constant, width in the circumferential direction.

In the case of the milling lug or web, the radially outer edge located or oriented in the operating direction of rotation may be realized, for example, as a milling edge, and the side surface of the web oriented in the operating direction of rotation may be realized as a chip surface. A free surface, oriented radially outwardly, which may be angled at a predefined free surface angle, may connect to the milling edge in opposite direction to the operating direction of rotation.

The web or the milling lug may protrude from a basic body of the milling tool by a predefined, preferably substantially constant radial height in the progression along the milling edge in the radial direction. The chip space base can be realized at least in part as an indentation in the basic body arranged upstream of the milling lug.

It may be provided in embodiments that between the chip space base of a first milling lug and a free surface edge of a free surface of a second milling lug following directly in the operating direction of rotation, the basic body comprises a basic body segment which follows the milling edge profile of the first and/or second milling lug. In this case, a radially outwardly oriented surface of the basic body segment can lie at a level which, when measured with reference to the operating axis of rotation, is at a radially higher level than the chip space base or the chip space root. In this case, the term free surface edge is to be understood as the edge on a free surface of the milling lug which is located opposite the milling edge in opposition to the operating direction of rotation.

The level of the basic body segment may be substantially constant between two milling lugs and/or can ascend toward the free surface edge of the second milling lug. By shaping the basic body segment arranged downstream of the milling lug with reference to the operating direction of rotation correspondingly, it is possible to improve the stability of the milling lug, and, for example, to reduce the risk of breakage.

By using or realizing the mentioned milling lugs with a predefined width in the circumferential direction, it is additionally possible to achieve that sufficient material is present for re-sharpening the milling edge.

A further advantage of the proposed realization of the milling edge, for example in the form of a milling lug with a defined width in the circumferential direction, may be seen in that the form of the milling edge, in particular the angle of twist, and the form of the chip space, in particular of the chip surface(s) and/or of the chip base, are able to be freely chosen and adapted to respective requirements within comparatively wide limits. Further options to improve the achievable milling accuracy, in particular surface quality, on the workpieces to be machined, are produced as a result of the named adaptation possibilities.

In embodiments, the milling edges can be realized in such a manner that the ratio between the number of milling edges arranged consecutively per revolution in the circumferential direction with reference to the operating axis of rotation and the minimum profile diameter of the operating area is between 0.2 and 1.0.

In further embodiments, multiple of the milling edge portions may be realized as milling teeth which are realized, in particular, in a dome-shaped manner with reference to the operating axis of rotation. In embodiments the ratio between the number of cutting teeth arranged consecutively per revolution in the circumferential direction with reference to the operating axis of rotation and the minimum profile diameter of the operating area of the milling tool may be between 0.2 and 1.0 in embodiments. The cutting teeth arranged consecutively in the circumferential direction may be arranged and realized, for example, substantially congruently with one another with reference to rotation about the operating axis of rotation with reference to a predefined axial position.

The smallest milling diameter of the milling tool in the operating area is to be understood as the minimum profile diameter. The minimum profile diameter can be located at an arbitrary position along the milling edge profile.

With regard to the possible number of milling edges or cutting teeth per revolution, it is possible in the case of the realization of the chip spaces proposed herein compared to the prior art, to provide more milling edges or cutting teeth per revolution with similar milling cutter geometry without, at the same time, significantly impairing the stability of the milling tool, it even being possible in embodiments to increase the stability in spite of the increased number of cutting teeth compared to milling cutters according to the prior art.

The milling tools proposed herein are suitable, in particular, for machining workpieces produced from metal and/or plastics material. For example, milling cutters realized corresponding to the design proposed herein are suitable for use as finishing cutters, for example for producing so-called fir tree structures on, for example, steam turbines and rotors of generators, for the fastening of corresponding rotor blades. It has been shown, in particular, that fir tree structures with comparatively high levels of surface quality are able to be produced with the milling tool proposed herein, it being possible to achieve an advantageously long tool life at the same time.

Compared to conventional milling tools, the chip space base of which is not realized corresponding to the invention described herein, twice the tool life can be achieved, for example, with the milling tool proposed herein. As a result of the substantially freely configurable form of the milling lugs and/or the chip space, and/or on account of the fact that milling lugs can be arranged at a comparatively small separation angle, for example within the range of between 8° and 120°, oscillations occurring during the milling operation are able to be reduced, for example, by up to 1.5 times compared to conventional milling tools. It is shown that the solution proposed herein enables comparatively high levels of surface quality with at the same time an advantageously long tool life.

As already indicated, it may be provided in embodiments of the milling tool that a free surface extends on at least one of the at least one milling edge in opposite direction to the operating direction of rotation, i.e. in opposite direction to the operating direction of rotation of the milling tool in the circumferential direction with reference to the operating axis of rotation. The free surface can comprise a predefined width measured in the circumferential direction, the width, in particular the average width, as already indicated, being able to be constant following the progression of the milling edge.

In embodiments, the free surface can be slanted with reference to the circumferential direction, for example thereby realizing a free surface angle within the range of between 0° and 15°. The free surface angle may be substantially constant in the progression along the milling edge.

By choosing the width of the free surface in a suitable manner, it is possible to adjust, in particular, the mechanical stability of a respective milling lug and/or cutting tooth in a suitable manner. The width of the free surface may be chosen, for example, in dependence on the separation, i.e. on the separation angle defined between adjacent milling edges. For example, the separation angle defined by the milling edges may be between three and 20 times, in particular between three and five times, the circumferential angle assigned to the free surface.

With the milling tool configuration proposed for the milling tool configuration herein, it is possible to adjust the separation angles of the milling edges and the circumferential angle of the free surface, and/or the distribution of the milling edges in the circumferential direction in a flexible manner, for example in such a manner that during a milling operation two or more milling edges always engage, at least in portions, the workpiece to be milled. In particular, the smooth running of the milling tool may be improved in this way, improvements with regard to the achievable levels of surface quality being able to be achieved as a result of the reduction in vibrations.

It may be provided in embodiments of the milling tool, as already indicated, that multiple milling edges are realized in the circumferential direction with reference to the operating axis of rotation. Milling edges which are directly consecutive in the circumferential direction are preferably arranged rotationally symmetrically with respect to one another with reference to the longitudinal direction of the operating axis of rotation. In other words, at least two of the multiple milling edges can be arranged and/or realized geometrically congruent with one another with reference to rotation about the operating axis of rotation.

In embodiments, immediately consecutive milling edges can be arranged, with respect to one another, for example, at a separation angle within the range of between 8° and 120°.

As at least already indicated, at least one of the at least one milling edge, may comprise a predefined angle of twist. Preferably all the milling edges comprise the same angle of twist, or substantially the same progression of angle of twist in the longitudinal direction of the operating axis of rotation. The angle/angles of twist can be, for example, within the range of between 5° and 50°, preferably 20°. However, it is also possible for the angle of twist to change in the progression along the milling edge, or for the angle of twist to vary in the progression along the milling edge, for example between a minimum and a maximum angle of twist.

It may be provided in embodiments that the separation angle or angles and angle or angles of twist, in particular the progression of the separation angle or angles and angle or angles of twist along the operating axis of rotation, are set up in such a manner that at least one milling tool sector, in particular clamped in the circumferential direction, is present in which, when viewed in axial projection with reference to the operating axis of rotation, are located a first cutting tooth of a first milling edge and a second cutting tooth of a second milling edge, wherein the first milling edge is spaced from the second milling edge in the circumferential direction by at least one times the separation angle, for example by an integer multiple of the separation angle, and wherein the milling tool sector covers a circumferential angle which is smaller than or equal to the separation angle. In other words, the separation angle/angles and angle/angles of twist, in particular the angles of twist, may be chosen in such a manner that in an axial top view of the milling tool, at least two cutting teeth are located within one milling tool sector, for example are located substantially one above the other in the axial direction, the milling tool sector being defined with reference to the operating axis of rotation, and enclosing an angle in the circumferential direction which is smaller than or equal to the separation angle. The first and second cutting teeth located in the same milling tool sector can have assigned thereto, for example, two milling edges which are spaced part from one another in the circumferential direction by one time the separation angle of the milling tool, in particular the minimum separation angle of the milling tool.

When realizing corresponding milling tool sectors, a corresponding adjustment or choice of the angles of twist/separation angles may achieve that during the operation of the milling tool, two cutting teeth of different milling edges engage simultaneously in the material to be machined by milling at least in the respective milling tool segment. As a result, a comparatively smooth operation, in particular with a reduced amount of vibration, may be achieved.

It may additionally be provided in embodiments that the milling tool comprises a rake angle within the range of between −3° and 24°, and/or a wedge angle within the range of between 51° and 93° for at least one, preferably for each of the milling edges. The mentioned angles are suitable, in particular, for the structure proposed herein and for the proposed design of the milling tool, it being possible, in particular, to achieve advantageous running characteristics for the milling tool during the milling by using the mentioned angle ranges. The latter also applies with regard to the free angle, reference being made to the above discussion with in regard to suitable angle ranges.

In embodiments of the milling tool, as already described further above, it may be provided that the at least one milling edge, preferably all milling edges, extends or extend over a predefined axial length of the operating area, measured parallel to the operating axis of rotation, wherein the at least one, preferably all, milling edge/s may comprise a milling edge profile which corresponds to a, in particular wave-shaped, fir tree profile, wherein the fir tree profile may include at least two, preferably at least three peaks and/or troughs. The machining area of the milling tool which includes the fir tree profile may comprise, as mentioned, for example, an overall form which is realized in the manner of a pagoda.

In embodiments of the milling tool, the operating area, as already mentioned, may comprise a basic body. The basic body may be realized in such a manner that the at least one milling edge, measured perpendicularly to the milling edge radially to the operating axis of rotation, is at a spacing from the basic body, in particular protrudes above the basic body by a predefined height, measured in the perpendicular direction to the milling edge or in the radial direction to the operating axis of rotation, the height, or a corresponding average height, may be, for example, substantially constant in the progression along the milling edge.

Between milling edges which are immediately adjacent in the circumferential direction, the basic body may comprise, as already indicated, one or multiple shoulder segments, the contour of which follows the milling edge profile. Each shoulder segment may extend, when viewed in the circumferential direction of the operating axis of rotation, between a milling edge and/or between the chip space base and/or chip space root assigned to the milling edge and a free surface edge arranged upstream of the milling edge in the operating direction of rotation. Reference is made to the discussion further above with regard to the definition of the free surface edge.

As a result of such shoulder segments, which may be realized, for example, between the chip space of the one milling edge and the free surface of a milling edge arranged upstream in the operating direction of rotation, it is possible to improve the mechanical strength and consequently the stability of the milling edges or the milling lugs further. For example, the shoulder segments may comprise rear surfaces which are turned radially outward, the radial height of which lies at least in part, preferably entirely, above the chip space base or towers over the chip space base. Consequently, the shoulder segments may be realized as a type of mechanical reinforcement for strengthening the mechanical stability of the milling edges/milling lugs.

It may be provided in embodiments that with reference to at least one axial position along the operating axis of rotation, i.e. with reference to at least one axial location, multiple consecutive milling edge portions, in particular arranged overlapping in a rotationally symmetrical manner, for example consecutive milling edges, are realized in the circumferential direction of the operating axis of rotation.

The basic body, in particular each of the shoulder segments, may comprise, between milling edge portions adjacent in the circumferential direction, one or multiple elevations and/or also flat portions which extend parallel to the circumferential direction and are, for example dome-shaped in cross section. When viewed in the radial direction with reference to the operating axis of rotation or perpendicularly to the milling edge, it may be provided in particular in the case of such embodiments that the chip space base lies at the same or at least in part at a lower level than a radial outer surface of at least one of the segments. It may be provided in embodiments that a respective chip space base or a respective chip space root and a shoulder segment following immediately in the operating direction of rotation, for example an elevation, lie at a different level, the chip space base or the chip space root being able to lie lower than the respective shoulder segment. A milling edge portion arranged downstream of the respective shoulder segment in the operating direction of rotation is able to be stabilized, in particular, as a result.

It may be provided in embodiments, as already indicated, that the milling tool includes a basic body, wherein the basic body is able to comprise multiple coolant and/or lubricant outlet openings. The coolant and/or lubricant outlet openings can be oriented, for example, radially to the operating axis of rotation. In addition, it is possible for the outlet openings to be arranged in each case at least in part or in portions between a respective milling edge and/or a respective chip space and a free surface edge arranged upstream of the milling edge or the chip space in the operating direction of rotation. It may be provided in embodiments that the opening planes of the outlet openings, when viewed radially to the operating axis of rotation, lie at the same height or lie at least in part higher than the respectively assigned chip space base or the respectively assigned chip space root. For example, the outlet openings can be arranged in the area of the above-named segments of the basic body. The outlet openings, insofar as the segments of the basic body follow the milling edge profile, can be oriented correspondingly at least in part approximately perpendicularly to the milling edge profile so that, for example, optimized feed of coolant and/or lubricant is possible.

In addition, it is possible in embodiments for the coolant and/or lubricant outlet openings to be located inside the shoulder segments, wherein at least two of the coolant and/or lubricant outlet openings are arranged at radially different heights. The radial heights of the coolant and/or lubricant outlet openings may vary and may follow, in particular, the milling edge contour. In particular, a distance, measured perpendicularly to the respective milling edge, between a circle line, which extends through the center point of the opening of a coolant and/or lubricant outlet opening, and the milling edge can be substantially the same for multiple, in particular all coolant and/or lubricant outlet openings. In other words, it may be achieved with the proposed milling tool that the distance, measured for example perpendicularly to the milling cutter surface, between the coolant and/or lubricant outlet openings and a respective milling edge is substantially the same for at least the coolant and/or lubricant outlet openings assigned to a milling edge, or for all the coolant and/or lubricant outlet openings, as a result of which, for example, improved distribution of coolant and/or lubricant can be achieved.

With the design of the milling tool proposed herein, it is possible to position the outlet openings freely in a suitable manner and within certain limits between milling edges adjacent in the operating direction of rotation or the circumferential direction. In particular, the outlet openings can be arranged, for example, at least in part or in portions outside the chip space base so that during milling a, for example temporary, closing of the outlet openings by chip material can be avoided.

It can be seen, in particular, from the above discussion that the object underlying the invention can be achieved with the milling tool proposed herein. In particular, improved tool life and/or improved levels of surface quality may/can be achieved.

A production method for a milling tool, i.e. a method for producing a milling tool, is provided in embodiments of the invention, wherein the milling tool comprises at least one milling edge and one chip space assigned to the milling edge, wherein the milling edge comprises a milling edge profile with a progression that is non-linear in portions, including the following steps:
provide a milling tool blank;
produce the at least one milling edge and the associated chip space on the milling blank as a result of material removal, wherein
the material removal is effected in such a manner that in the case of the finished milling tool, a radial or perpendicular distance between the milling edge and the chip space base is substantially constant at least in portions.

It may be provided in embodiments that a milling method is used for machining the material. For example, the operating area, including the milling edge(s) and the chip space/spaces, can be produced in a milling method.

Material removal can be carried out in embodiments in such a manner that each of the milling edges is realized on a milling lug which projects opposite above a basic body, and the contour of the basic body is realized corresponding to the milling edge contour between milling lugs adjacent in the circumferential direction as a result of material removal, i.e. that the contour of the basic body is produced by material removal between milling lugs adjacent in the circumferential direction, in such a manner that the basic body comprises a contour which corresponds to the milling edge contour, in particular that the contour of the basic body follows the milling edge contour.

Materials such as solid carbide (VHM) or high-powered high-speed tool steel (HSS) are suitable, in particular, for producing the milling tool. In particular, the milling tool may be a milling tool produced in one piece from a homogeneous material.

BRIEF DESCRIPTION OF THE DRAWINGS

The invention is described in more detail below, in particular also with regard to further features and advantages, by way of the description of exemplary embodiments of a milling tool as examples and with reference to the accompanying drawings, in which.

DETAILED DESCRIPTION OF THE PREFERRED EMBODIMENTS

Parts and components which correspond to one another in FIG. 1 to FIG. 13 are provided with reference symbols which correspond to one another.

Figure 1:
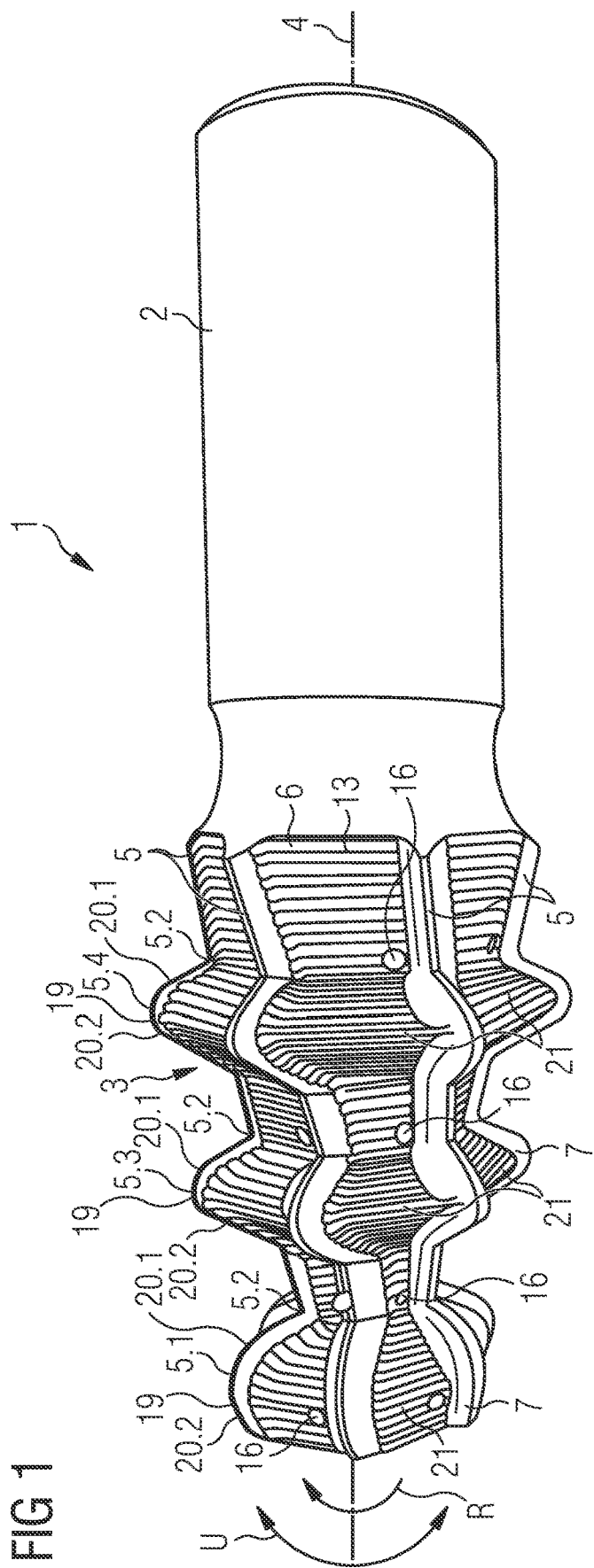
FIG. 1 shows a side view of a first variant of the milling tool.

FIG. 1 shows a milling tool 1 according to a first variant. The milling tool 1 of the embodiment shown is an end mill, in particular a finishing cutter, with a fir tree-shaped milling edge profile, or milling profile. Milling cutters of this type are also known as fir tree cutters.

The following description does relate to a fir tree cutter, however the features and characteristics described below, in particular relating to milling edge(s) and/or chip space or chip spaces are not limited to fir tree cutters but can also be applied and implemented in the case of other types of milling cutters.

The milling tool 1 includes a shank 2 and a machining head 3 connecting thereto. The shank 2 is realized for the clamping of the milling tool 1 in a clamping chuck (not shown).

For milling, for example for finishing, a workpiece (not shown), the clamped milling tool 1 is rotated by means of a drive coupled with the clamping chuck about the operating axis of rotation 4 (in particular also: tool axis), which coincides in the present case with the longitudinal axis of the milling tool 1, and the machining head is moved relative to the workpiece, for example, into engagement with the workpiece to generate the respectively desired milling structure.

The machining head 3 of the milling tool 1, in other words the operating area of the milling tool, includes in the circumferential direction U with reference to the operating axis of rotation 4, or in the operating direction of rotation R with reference to the operating axis of rotation 4, multiple milling edges 5 which extend transversely to the circumferential direction U or operating direction of rotation R.

Figure 2:
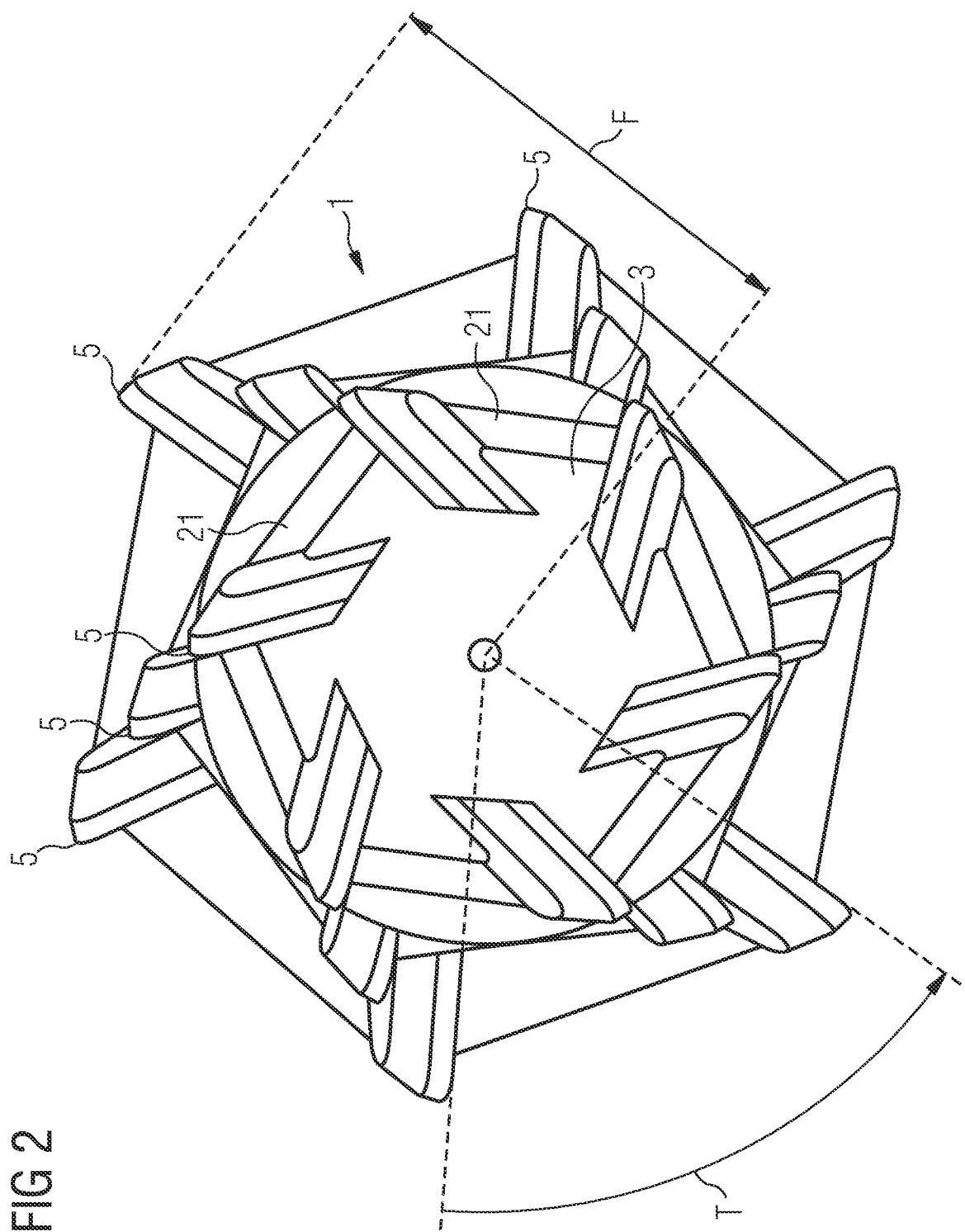
FIG. 2 shows a cross sectional representation of the milling tool.

The milling edges 5 as can be seen from FIG. 2 which shows a cross sectional representation of the milling tool 1, are arranged consecutively in the operating direction of rotation R at a predefined separation angle T so as to be rotationally symmetrical to the operating axis of rotation 4. In the present case, the separation angle T is approximately 60 degrees, other, in particular smaller separation angles T also being considered, as can be seen from the further description.

Figure 3:
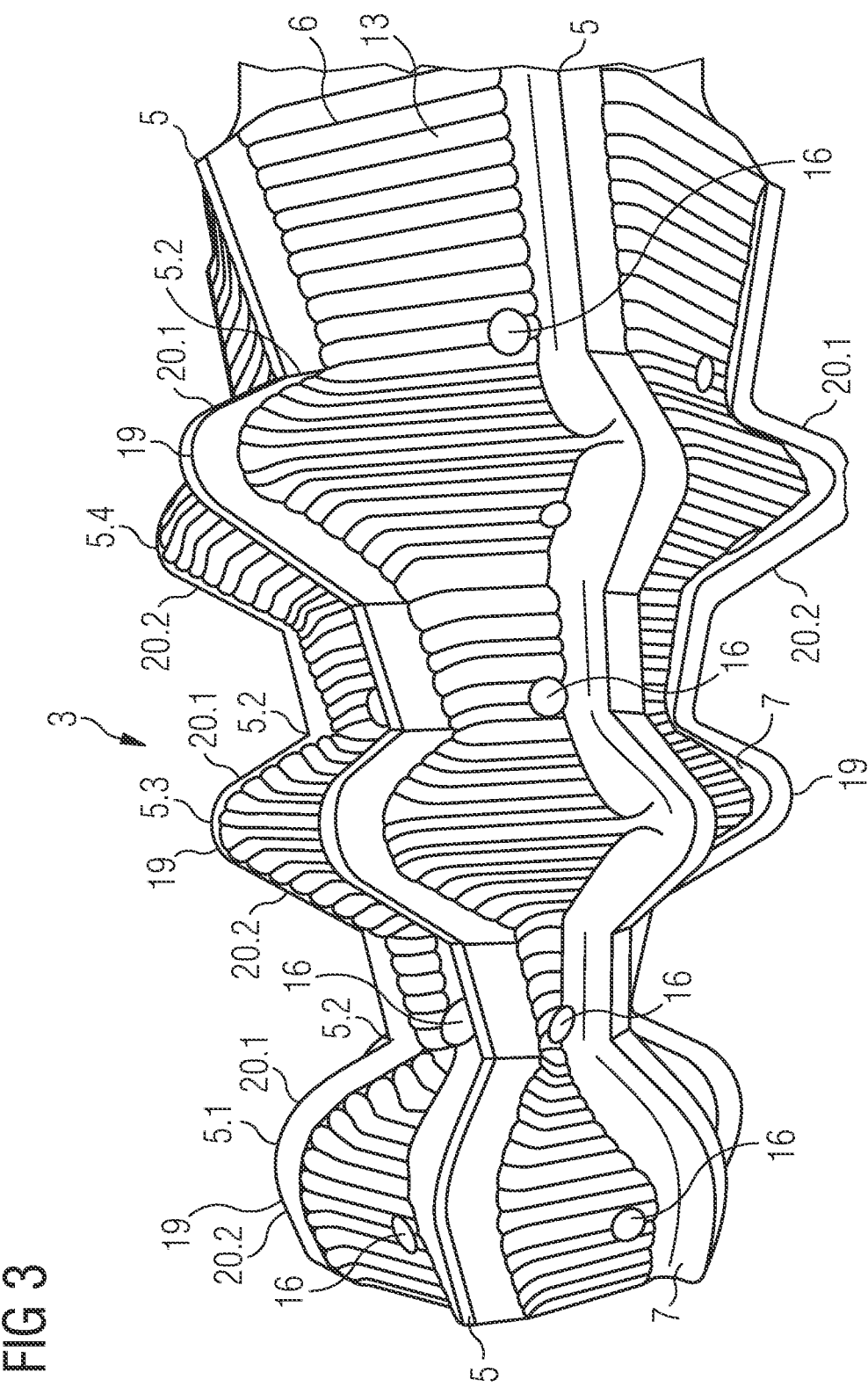
FIG. 3 shows a representation of a detail of the machining head of the milling tool according to FIG. 1.

As can be seen from FIG. 1 and from the representation of the detail in FIG. 3, the milling edges 5 extend along a basic body 6, in particular when viewed in a radial projection onto the basic body 6 or in a radial projection onto the lateral surface of the basic body 6, at a predefined angle of twist.

The angle of twist and/or the separation angle T named further above is/are preferably chosen in such a manner that a workpiece is able to be milled in such a manner that at least two milling edge portions of two different milling edges 5 which are, for example, consecutive in the circumferential direction, always engage the workpiece, which will be described in even more detail in connection with FIG. 9 and FIG. 10. Such an arrangement of the milling edges 5 along the basic body 6 is possible as a result of the realization proposed herein of the milling tool, engagement of two milling edges 5 enabling milling with improved smooth running, as a result of which improved milling cutter results, for example levels of surface quality, can be achieved on the workpiece to be machined.

The milling edges 5 of the milling tool 1 each comprise at least one, in the present case in each case multiple, milling edge portions 5.1-5.4, in which a milling edge profile P (FIG. 4) defined by the local or locally averaged milling edge radius F (FIG. 2) measured with reference to the operating axis of rotation comprises at least one portion with a non-linear progression. The term milling edge radius F is to be understood, in particular, in the case of linear, i.e. continuous, milling edges 5 as in the exemplary embodiment shown, as the respective radial distance between the milling edge 5 and the operating axis of rotation 4 or tool axis.

At least one of the milling edge portions 5.1-5.4 can be realized in such a manner that, for example, the local, or locally averaged, milling edge radius F first of all increases and then decreases again along the milling edge 5 which is the case, for example, with the cutting teeth 19 present in the shown milling edge portions 5.1, 5.3 and 5.4, which in each case comprise an ascending 20.1 and a descending milling edge flank 20.2 in the direction from shank 2 to operating area 3.

In particular in the region of the cutting tooth apex, the cutting edges 5 comprise portions with a non-linear progression. The milling edges 5 of the example shown in FIG. 1 include a mixture of portions with a linear and non-linear progression, embodiments without linearly extending milling edges also being possible, similar to, for example, as in FIG. 6 or 7.

At least one of the milling edge portions 5.1-5.4 can be realized in such a manner that in at least one milling edge portion, the milling edge profile P, i.e. the curve of the milling edge profile P, when viewed geometrically, comprises a turning point (for example between 5.1 and 5.2), an extreme point (at 5.1, 5.3, 5.4, at the apex points of the cutting teeth 19) and/or a point of discontinuity in its derivative or gradient (for example at 5.2, in the transition region between the linear portion and the ascending milling edge flank 20.1).

The respective milling edge portion may comprise one or multiple, for example substantially linear or substantially rectilinear, part portions with different gradients. Further progressions for the milling edge profile P are conceivable, apart from the milling edge profiles shown in the figures relating to the milling tool 1, the underlying invention also being applicable to other milling edge profiles P which show a progression with at least one non-linear portion.

Figure 4:
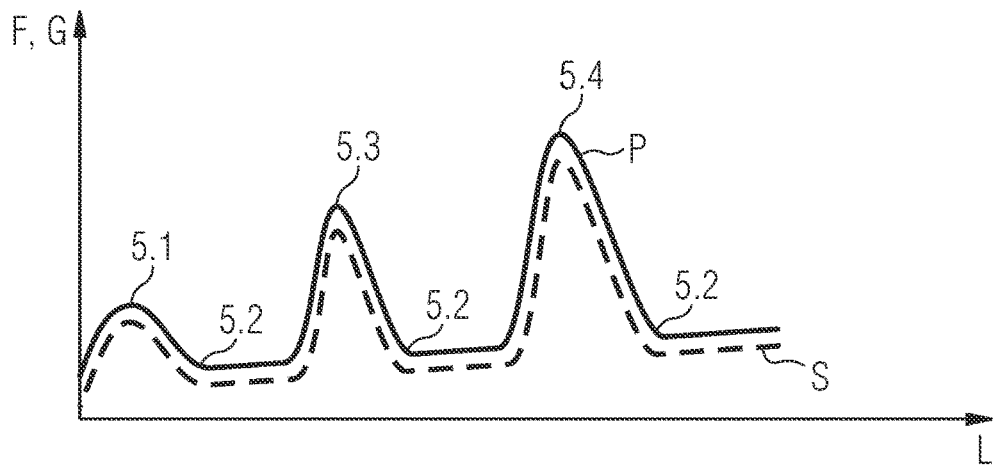
FIG. 4 shows a diagram showing the milling edge profile and chip space base profile.

FIG. 4 shows as an example a milling edge profile P, the form of which is chosen in the style of the milling tool 1 shown in FIG. 1 to FIG. 3. In the representation in FIG. 4, the axial length L, measured for example from the end-face axial end of the machining head 3 in the direction of the shank 2, is recorded on the x-axis, and the milling edge radius F, or the radius of the milling edge base discussed in more detail below, designated subsequently by way of milling edge base radius G, is recorded on the y-axis.

As can also be seen from FIG. 4, the milling edge profile P includes multiple milling edge portions 5.1-5.4 in which the milling edges 5 demonstrate a non-linear progression at least in portions.

To avoid possible ambiguities, it shall be mentioned that the term milling edge radius F can be understood herein, in particular, as the local distance, measured in the radial direction, between the radially outer edge of the milling edge and the operating axis of rotation 4.

In the case of the milling tool 1 shown in the figures, the basic body 6, and also the machining head 3, comprises a form which is realized in a similar manner to a pagoda. Correspondingly, the milling edge portions can be realized, for example, as peaks, for example at 5.1, 5.3 and 5.4, or troughs, for example at 5.2, with a linear or curved milling edge profile progression, the peaks in the present example being realized as cutting teeth 19.

The milling edge 5 shown in the figures is a smooth, i.e. continuous, milling edge, in particular without roughing toothing and the like, however it is pointed out in connection with the invention that the invention described herein is also applicable to discontinuous milling edges, for example, rough-cut milling edges and the like, it being possible to consider, for example, a locally averaged milling edge radius or a locally smoothed milling edge radius where the progression of the milling edge is discontinuous. For further discussion relating to discontinuous milling edges reference is made to the statements further above.

The at least one milling edge portion can comprise, for example, a milling edge profile P where the milling radius F can vary by up to 0.5 times the maximum milling edge radius of the respective milling edge.

For example, between two and ten of the milling edge portions 5.1-5.4 may be present over the axial length of the machining head 3 along a milling edge 5, for example in the form of multiple cutting teeth 5.1, 5.3, 5.4 with tooth roots located in between, for example at 5.2. For example, the milling profile can be realized in the manner of a fir tree milling profile, the machining head 3, in particular the basic body 6, as shown in the exemplary embodiments of the figures, being able to comprise a form realized according to a pagoda.

The at least one milling edge 5 may comprise multiple of the named milling edge portions which can be realized, for example, curved convexly or concavely in a radial manner with reference to the operating axis of rotation 4. Further curvatures may be produced, for example, from a more or less twisted progression of the milling edges 5 themselves. The milling edge portions, however, may comprise, at least in portions, a linear progression. It is pointed out that each of the milling edges 5 as such may also be considered as a milling edge portion, for each of the milling edges includes at least one non-linear portion.

In the case of the machining head 3, the milling edges 5 have arranged upstream thereof in the operating direction of rotation R in each case chip spaces 7, by means of which the chip material, generated during the milling operation during the cutting engagement of the milling edges 5 or removed from the workpiece, can be received, directed, formed and/or transported.

Figure 5:
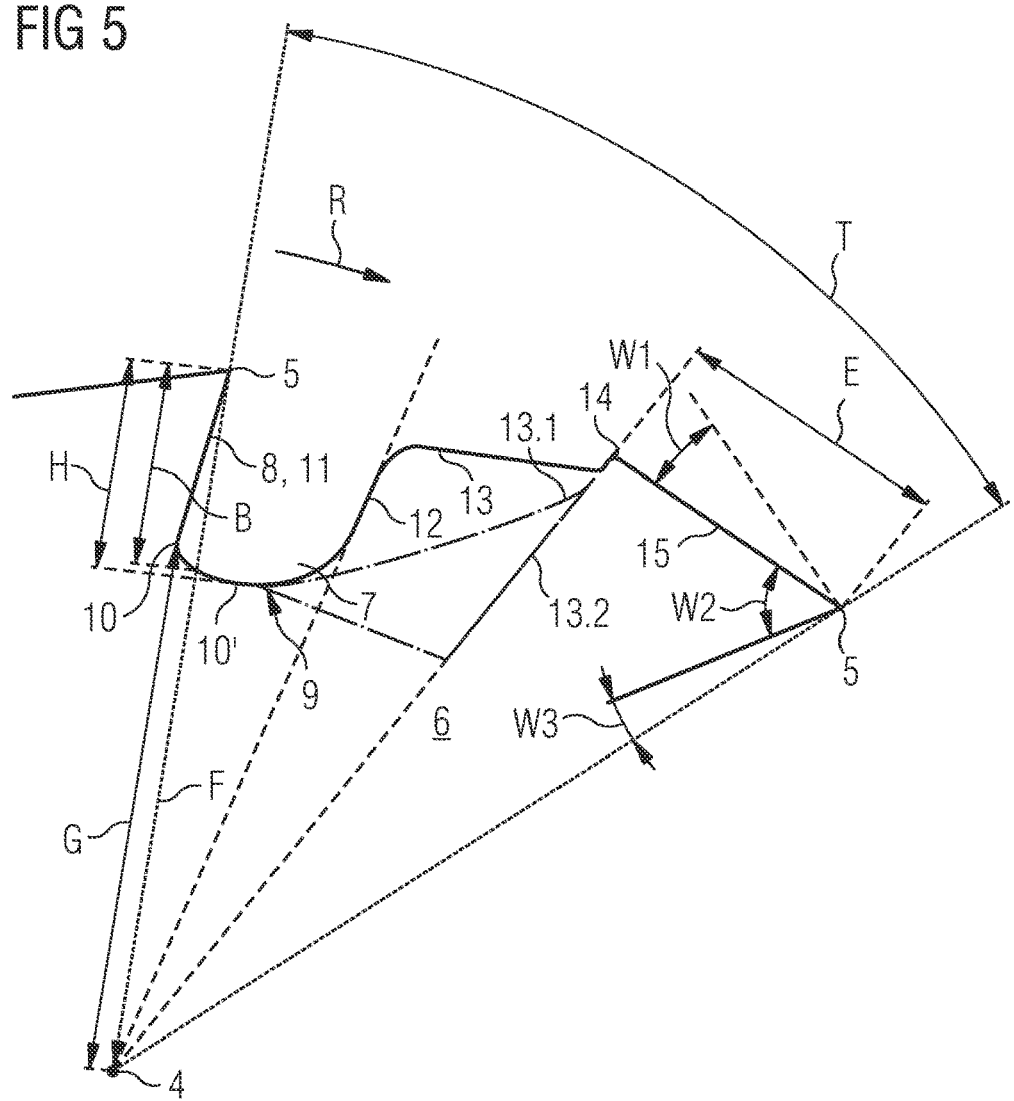
FIG. 5 shows a schematic representation of part of an axial section of the machining head of the milling tool.

The relative arrangement of milling edge 5 and chip space 7 is shown as an example in the sectional representation shown in FIG. 5 relating to a part of an axial section of the milling tool 1.

As can be seen in FIG. 5 the chip space 7 in the present case is defined, among other things, by a chip surface 8 which is located radially within the milling edge 5 and connects to the milling edge 5 i.e. connects to the milling edge, extends in the radial direction toward the operating axis of rotation 4, and extends up to the chip space base 9 of the chip space 7. The intersection point or the intersection line 10 between chip space base 9 and chip surface 8, or the contour line 10', which extends in the chip space base 9, at which the chip space base 9 is at the smallest radial height in relation to the operating axis of rotation 4, may also be designated as the chip space root. In addition, the chip space 7 is defined by a width, which is measured in the circumferential direction U or in the operating direction of rotation R, or by a circumferential angle which is measured with reference to the operating axis of rotation 4, which width or circumferential angle may be substantially constant, for example, in the progression along the milling edge 5. In particular, in sections perpendicular to the milling edge 5 the chip space 7 may comprise a cross section which is substantially constant in the progression along the milling edge 5. In alternative embodiments, it is possible for the cross section of the chip space 7 to vary along the milling edge 5 width and/or height of the chip space being able to vary.

As can be seen from FIG. 1 and FIG. 2, along the milling edge 5 the chip space base 9 or the chip space root 10, or 10', comprises a progression which follows the milling edge profile P. This is shown as an example in the diagram in FIG. 4, the broken line representing the given progression of the chip space base 9 corresponding to the progression of the milling edge 5 or as an option the progression of the chip space root 10, 10', the chip space base profile S. As already indicated, the chip space base profile S is defined by the radius G of the chip space base 9 or of the chip space root 10, 10' measured in each case with reference to the operating axis of rotation. In FIG. 4, the radius G of the chip space base is recorded in dependence on the axial length L.

The wording "following the milling edge 5" shall be understood, in particular, such that the distance between chip space base 9 or chip space root 10, 10' and milling edge 5 measured perpendicularly to the milling edge 5 or measured in the radial direction with reference to the operating axis of rotation 4, is substantially non-varying or constant at least in portions. In the representation in FIG. 4, the chip space base 9 or the chip space base profile S follows the milling edge profile P over the entire length of the machining head 3 both in linear and non-linear portions of the milling edge profile P. However, it is also possible for the chip space base profile S only to follow the milling edge profile P in part in the portions with a non-linear progression, for example to extend parallel to the milling edge 5 only in portions in the non-linear portions.

The respective chip spaces 7, as in the exemplary embodiments shown, may comprise a height H which is substantially constant along the milling edge 5, the height H of the chip space 7 being able to be provided, for example, by the difference between the milling edge radius F and the respective radius G of the chip space base 9, or by the perpendicular distance between the chip space base 9 and the milling edge. Depending on the configuration of the chip space 7, the height H of the chip space 7 may be identical to the width of the chip surface 8.

Where the form of the chip spaces 7 is realized as described, it is possible to obtain a chip surface 8 which comprises a substantially constant width B over the progression of the milling edge 5 at least, however, in the milling edge portions 5.1-5.4, measured, for example, as the distance, measured perpendicularly to the milling edge 5 between chip space base 9 and milling edge 5. The chip surface 8 may be realized, for example, in the form of a chip surface strip with a substantially constant width measured perpendicularly to the milling edge.

As a result of the chip surfaces 8 having a constant width B and/or the chip spaces 7 having a constant height H, at least similar, in particular substantially non-varying, chip formation characteristics and/or a similar and/or substantially non-varying chip removal can be achieved, for example, over the entire length of the milling edge 5 as a result of which improved levels of surface quality are able to be achieved during milling.

In addition, compared to realizations according to the prior art, improved stability of the milling edge 5 and of the milling tool 1, in particular of the machining head 3, can be achieved as a result of the chip space base 9 or the chip space root 10, 10' following the milling edge profile P. For example, the risk of breakage, in particular in the region of the milling edge 5 can be improved as a result of improved stability, as a result of which extended tool life is able to be achieved.

In particular, improved mechanical stability may be achieved for the cutting teeth 19, for it is possible to achieve mechanical stabilization and support of the cutting teeth 19 as a result of the saddle-like projections 21 realized in the circumferential direction U between adjacent cutting teeth 19, the contour of which, for example in sections parallel to the operating axis of rotation 4, follows the contour of the cutting teeth 19 or corresponds to the contour of the cutting teeth.

Compared to known milling tools where the chip space base extends between adjacent cutting teeth 19, for example at a constant radial height above the operating axis of rotation, with the proposed geometry of the chip spaces 7 it is also possible to achieve modified mass distribution with the milling tool, for example with increased inertia moment, as a result of which, among other things, the quiet running of the milling tool is able to be influenced, in particular improved.

The chip spaces 7 described in connection with FIG. 1 to FIG. 5 are realized in a substantially U-shaped or V-shaped manner in the region which connects directly to the milling edge 7, with a first leg 11, which extends between chip space base 9 and milling edge 7 and is formed substantially by the chip surface 8, and a second leg 12. The second leg 12 comprises a smaller radial height than the first leg 11 and extends between chip space base 9 and a transition region 13, which is realized in the present exemplary embodiment in the manner of a plateau or a shoulder segment. The transition region 13 or the corresponding shoulder segment is elevated in relation to the chip space base 9 and extends from the second leg 12 in the operating direction of rotation R up to a free surface edge 14 of a milling edge 5 following in the operating direction of rotation R.

The transition region 13, or the shoulder segment 13, may, however, be realized in embodiments in another manner. For example, it is possible for the transition region 13, proceeding from the chip space base 9, for example without specific realization of a shoulder, to ascend continuously toward the free surface edge 14, the transition region 13 being able to be realized in a curved manner, where applicable concavely or convexly, in particular substantially uniformly convexly or concavely, which is shown in FIG. 5 as first variant 13.1 according to the dot-dash line.

In addition, it is possible for the transition region 13, proceeding from the chip space base 9, to extend at an approximately constant radial height in the circumferential direction U, or operating direction of rotation R, and to demonstrate a substantially radial progression in the region of the free surface edge 14, which is shown in FIG. 5 as second variant 13.2 according to the double dot-dash line.

A free surface 15, which is delimited in the circumferential direction U on the one side by the free surface edge 14 and on the other side by the milling edge 7, connects to each of the milling edges 5 in opposition to the operating direction of rotation R. Measured in the circumferential direction U, the free surface 15 comprises a predefined free surface width E which, either measured as an absolute length in the circumferential direction, or measured as an angle with reference, for example, to the operating axis of rotation 4, is substantially constant or non-varying in the progression along the milling edge 7.

In the exemplary embodiment shown, respective milling edges 7 and free surfaces 15 realize a lug or milling lug which extends along the milling edge 7, comprises, measured in the circumferential direction U, the predefined free surface width E, extends on the basic body 6 at a predefined angle of twist and from the basic body 6, comprises a predefined, in particular substantially constant thickness measured in the radial direction. Measured with reference to the operating axis of rotation 4, the radial height of the milling lug varies corresponding to the milling edge profile P so that the cutting teeth 19 are realized in the region of the milling edge portions 5.1, 5.3, and 5.4. The difference between the radial height of the milling lug and the radius G of the chip space base 9 may be constant in embodiments following the progression of the milling edge 5. In further embodiments it may be provided that the height of the milling lug, measured perpendicularly to the milling edge, above the chip space base is substantially constant. Improved stability, in particular break stability, can be achieved over the longitudinal extension of the milling lug with non-varying heights.

In the case of the milling tools shown in the figures, the basic body 6 is realized in such a manner in the intermediate region between two milling edges 5, following one another in the circumferential direction that the contour thereof follows the milling edge profile P, the radial height of the basic body, measured with reference to the operating axis of rotation 4, in the region between the chip space 7 of a first milling lug and the free surface edge 14 of a subsequent second milling lug, being able to be greater than the radius G in the chip space base 9. The free surface 15 and the free surface edge 14 are also realized, in particular in the case of all milling lugs, such that they comprise a contour or a profile which follows the milling edge profile P, i.e. is geometrically congruent with the milling edge profile P.

A milling process with the milling tool 1 running smoothly in an improved manner can be achieved with the proposed milling geometry, and the generation of vibrations caused by the milling can at least be countered.

The free surface 15 may be realized in such a manner that it is slanted at a predefined free surface angle W1 which may be, for example, within the range of between 0° and 15°.

As can be seen from FIG. 1 and FIG. 3, the chip space 7 may be realized, in particular, in such a manner that the cross section thereof, following the progression of the milling edge 5 or of the chip space base 9, is constant over the entire length of the milling edge 5 at least, however, over the entire length of a milling edge portion. For example, the chip space 7 may be realized as a type of groove which comprises substantially non-varying geometry in the progression along the chip space 7 in the radial direction and the circumferential direction U. Corresponding structures may be produced, for example, on a corresponding blank as a result of material removal, for example by milling.

Compared with conventional milling tools where the profile of the chip space base simply demonstrates a linear progression, it is possible in the case of the milling tool 1 proposed herein to increase the number of milling edges 5 or cutting teeth 19 or milling lugs present in the circumferential direction U, that is to say it is possible for the separation angle T to be reduced compared with known milling cutters. By reducing the separation angle T, using the milling tool 1 proposed herein, in contrast to the named known milling tools, it is possible to achieve an improvement with regard to the mechanical stability of the operating area, as in the case of the milling tools 1 proposed herein, for example the transition regions 13, in particular the saddle-like projections 21, have a stabilizing effect such that, in particular, the risk of breakage is able to be reduced. By decreasing the separation T, that is to say increasing the number of milling lugs or milling webs in the circumferential direction U, it is possible to increase the tool life for example by a factor of up to 1.5 compared with conventional milling tools.

In the case of the milling tools 1 proposed herein, the chip space 7 and the angle of twist may be freely varied across a wide range without, at the same time, modifying or impairing the mechanical stability of the milling tool 1 in a significant manner.

The milling lugs may be realized in such a manner that they comprise a wedge angle W2 within the range of between 51° and 93°, and/or a rake angle W3 within the range of between −3° and 24°.

In particular on account of the higher mechanical stability and strength of the milling lugs achievable with the advantageous milling cutter geometry proposed herein, the free surface angle W1, wedge angle W2 and rake angle W3 can be chosen in a comparatively flexible manner so that it is possible to adapt the milling tool 1 flexibly to the material to be machined in each case and/or corresponding to the milling edge profile P necessary in each case.

As can be seen in particular from FIG. 1 and FIG. 3, the milling tool 1 further comprises multiple coolant and/or lubricant outlet openings 16. The coolant and/or lubricant outlet openings 16, referred to below in short as outlet openings 16, may be realized, for example, as the mouth openings of radial bores which may be fluidically connected at the ends remote from the outlet openings 16 to an axial coolant and/or lubricant channel which extends in the interior of the milling tool 1.

Due to the space-saving realization, made possible with the present invention, of the chip spaces 7 in the circumferential direction U, the outlet openings 16 may be arranged in a comparatively flexible manner compared with conventional milling tools. In particular, the outlet openings 16 can be arranged at least in part in the transition regions 13.

As the contour of the transition regions 13 may follow the milling edge profile P, i.e. may be realized corresponding to the milling edge profile, the outlet openings 16 may be introduced, with regard to radial height, for example close to the milling edges 5 such that coolant and/or lubricant distribution to the milling edges 5 can be improved.

Figure 6:
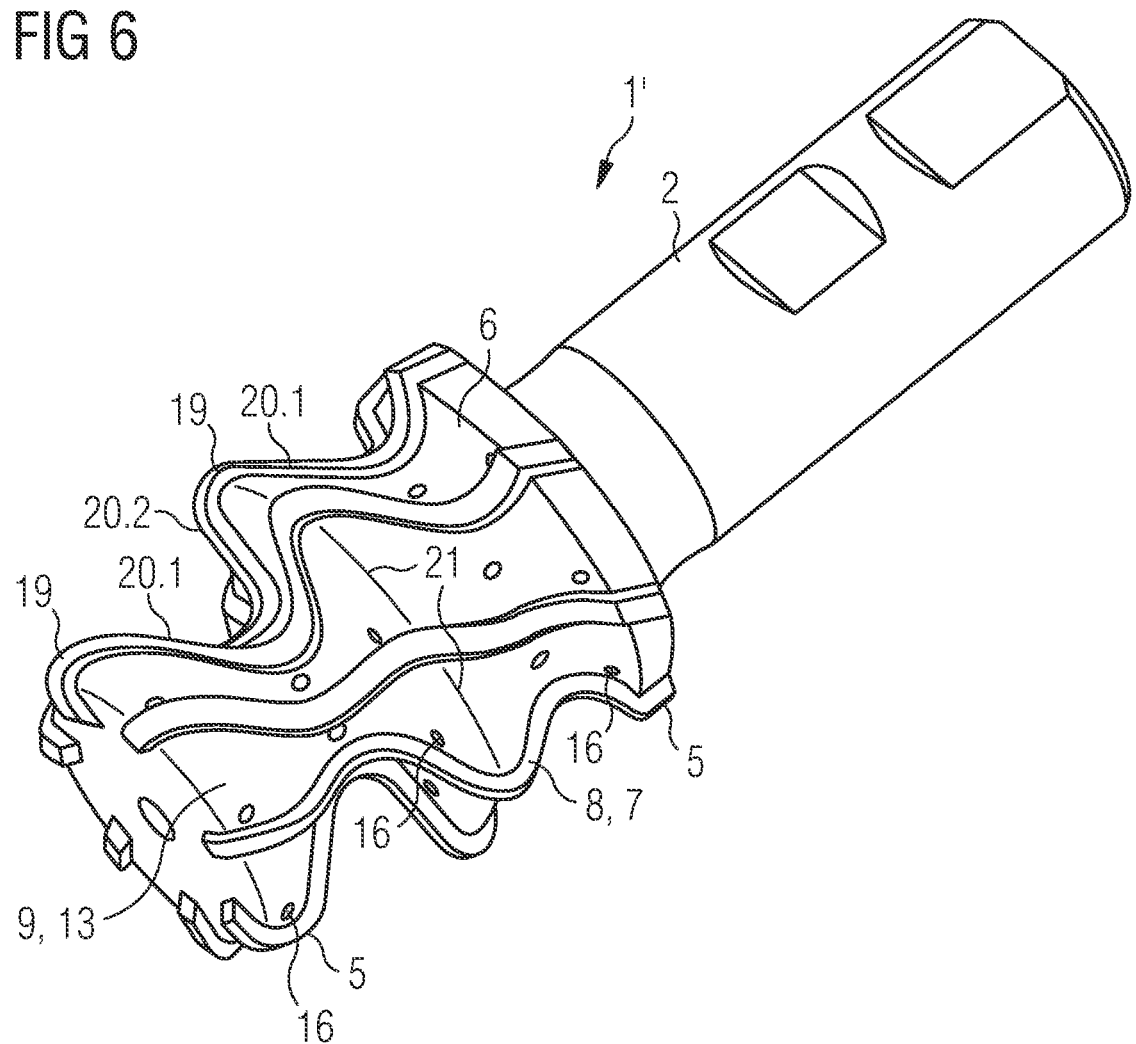
FIG. 6 shows a milling tool according to a second variant.
Figure 7:
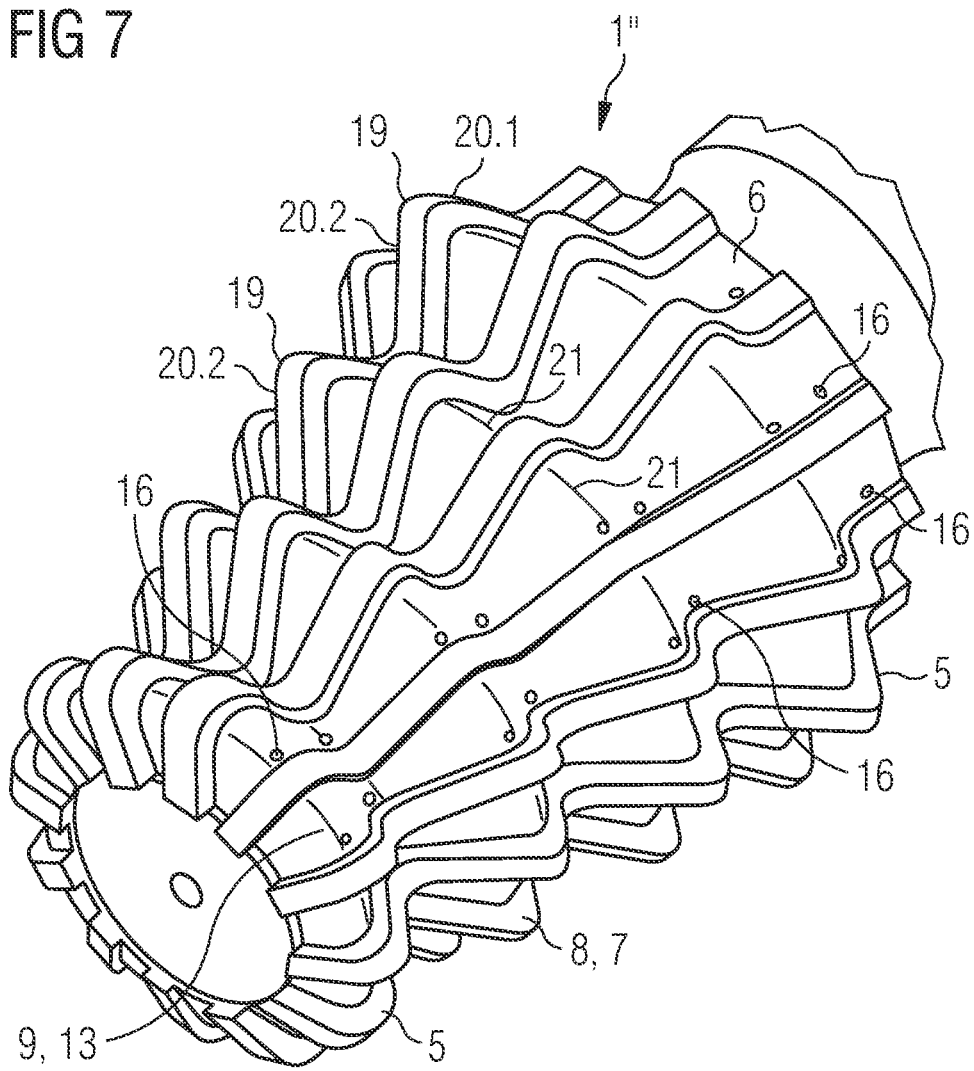
FIG. 7 shows a milling tool according to a third variant.

FIG. 6 shows a milling tool 1' according to a second variant, and FIG. 7 shows a milling tool 1" according to a third variant.

The milling tools 1' and 1" according to the first and second variants differ from the milling tool 1 according to the first variant in particular in that the milling edges 5 are arranged with respect to one another at another, in particular smaller, separation angle T. This shows that in the case of the milling tool proposed herein, the milling edges 5 are able to be arranged in a comparatively flexible manner. In addition, it can be seen that the angle of twist is able to be chosen freely within a wide range.

Furthermore, different milling edge profiles P are able to be implemented with the proposed milling cutter geometry. Thus, the milling tool 1' according to the second variant comprises milling edges 5 with two troughs, whilst the milling tool 1" according to the third variant comprises at least three troughs in the milling edge profile P.

From FIG. 6 and FIG. 7 when viewed together with FIG. 1 to FIG. 5 it follows additionally that with the milling cutter geometry proposed herein, the milling edges 5 are able to be arranged in such a manner that during the milling operation at least two milling edges 5 always engage the workpiece at least in portions, as a result of which the smoothness of the milling tool 1, 1', 1" is able to be improved.

Figure 8:
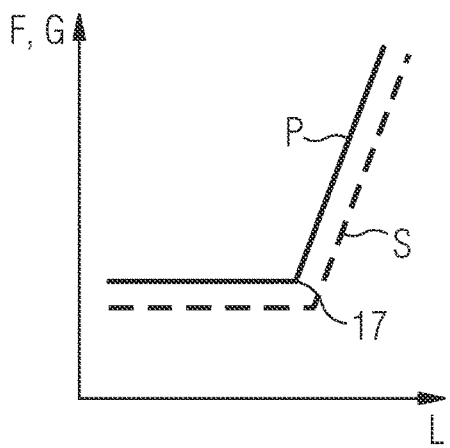
FIGS. 8 to 10 show parts of different milling edge profiles.
Figure 9:
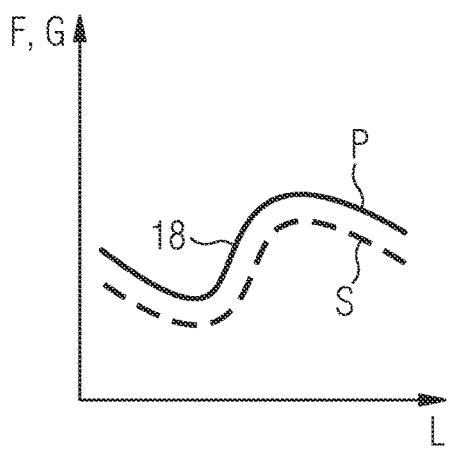
Figure 10:
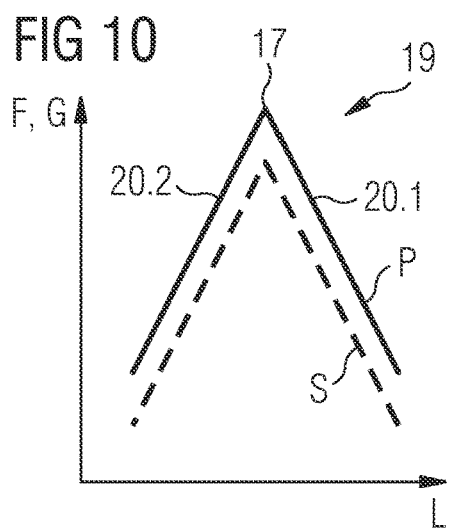

FIG. 8 to FIG. 10 show parts of milling edge profiles P and of associated chip space base profiles S which may be implemented according to the invention proposed herein, and where, in a region which includes a non-linear progression in the milling edge profile P, the chip space base profile S follows the milling edge profile P, or where the chip space base profile S is realized in a corresponding manner to, in particular in a geometrically congruent manner with, the milling edge profile P. For example, the chip space base profile S may be displaced substantially parallel to the milling edge profile P. It is also possible for the radial distance or the distance measured perpendicularly to the milling edge 5 between the milling edge 5 and the chip space base 9 to be substantially constant or non-varying following the progression of the milling edge 5.

The milling edge profiles P to corresponding milling edge portions shown in FIG. 8 to FIG. 10 show regions with a non-linear progression overall.

The milling edge profile P shown in FIG. 8 includes two straight part portions, the milling edge radius F being substantially constant in a first part portion and the milling edge radius increasing linearly in a second part portion such that the milling edge profile formed from both part portions includes a non-linear progression overall. At the intersection point 17 of the two part portions, the derivative or ascent of the milling edge profile P has a point of discontinuity from a geometric perspective.

In the example in FIG. 9, the milling edge profile P, and correspondingly the chip space base profile S, comprises a wave-shaped, non-linear progression, with a trough and a peak. From a geometric point of view, the milling edge profile P comprises a turning point 18 in the region between peak and trough.

In the example in FIG. 10, the milling edge portion shown is realized in the manner of a prong, in particular in the manner of a cutting tooth 19, with two linear part regions, i.e. one linearly ascending part region or one ascending cutting tooth flank 20.1, and one linearly descending part region or one linearly descending cutting tooth flank 20.2, the milling edge profile P comprising a point of discontinuity in its derivative at the intersection point 17 or apex point of the two part regions. The milling edge portion shown consequently comprises a non-linear progression overall, corresponding to the underlying invention the chip space base profile S having a progression which corresponds to the milling edge profile, i.e. also comprising a point of discontinuity in its derivative.

The milling edge portions shown in the figures can also comprise other progressions. For example, a convexly or concavely curved progression of the milling edge can be provided in place of a straight progression, and it is possible to provide arbitrary combinations of milling edge portions named and described herein in connection with the invention, in particular arbitrary combinations of straight and curved portions with a non-varying, decreasing or increasing milling edge radius, with increasing or decreasing gradient, etc. . . . .

Figure 11:
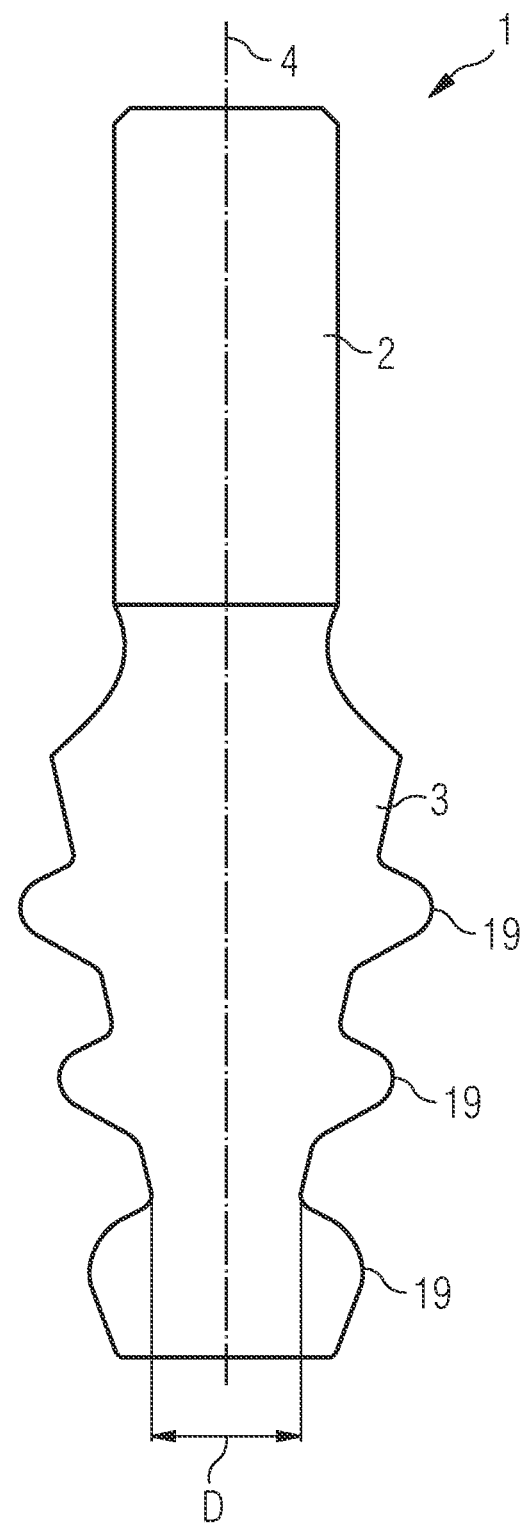
FIG. 11 shows a schematic side view of the milling tool in FIG. 6.
Figure 12:
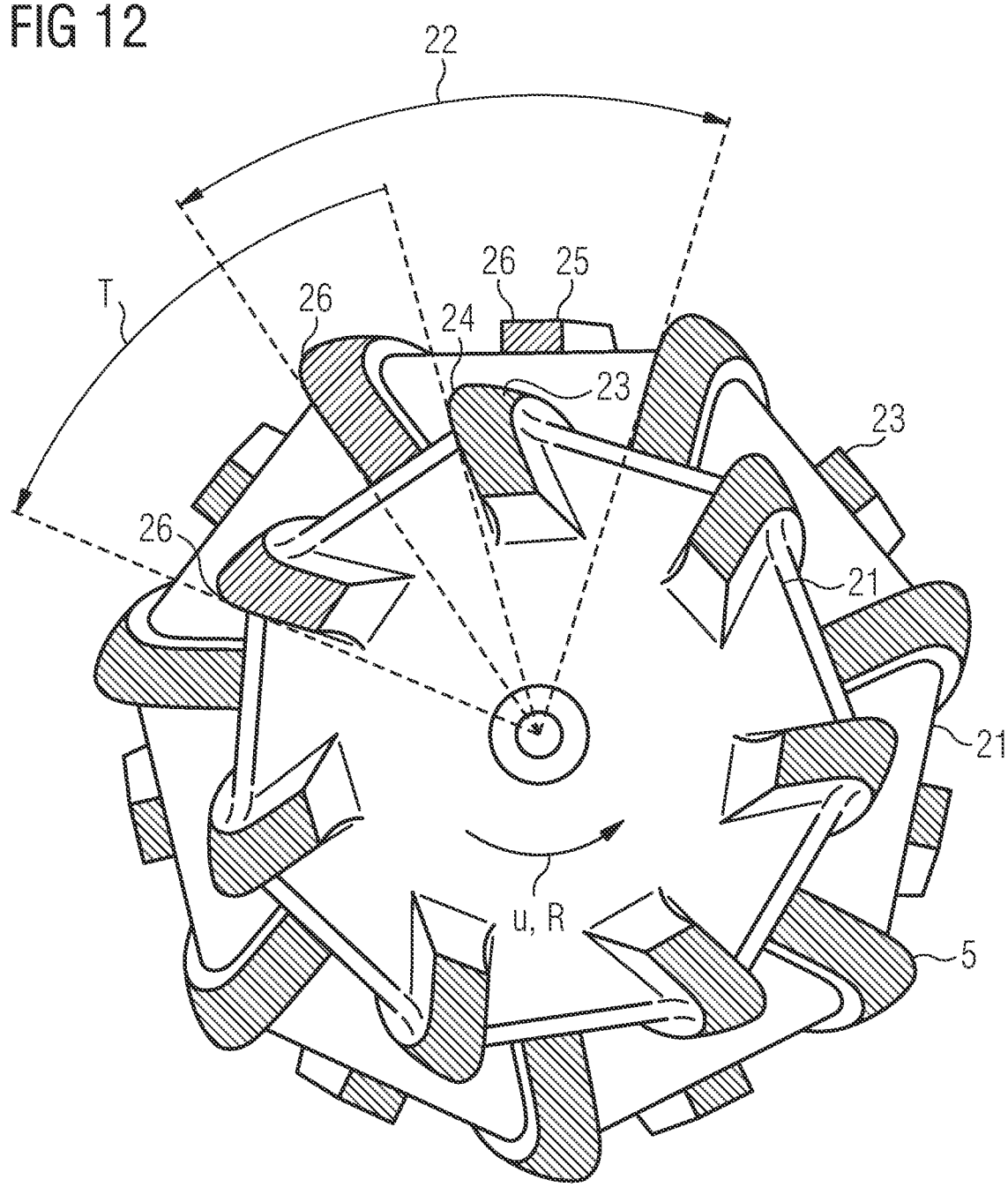
FIG. 12 shows an axial top view of the milling tool according to FIG. 11.
Figure 13:
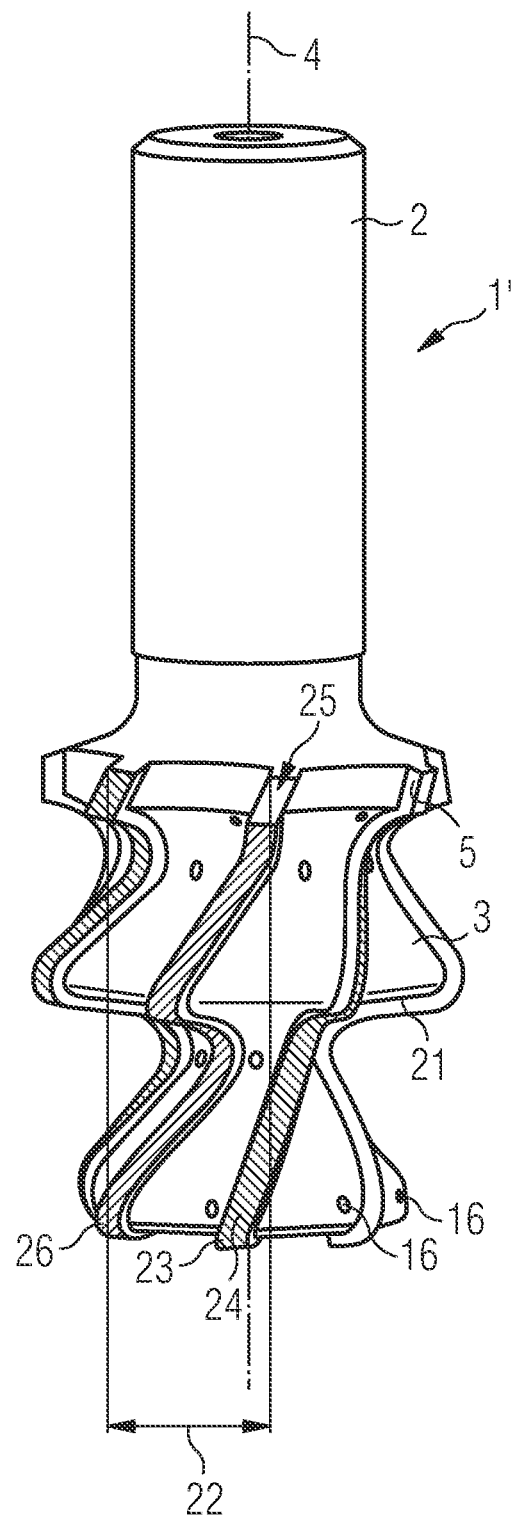
FIG. 13 shows a side view of the milling tool according to FIG. 12.

FIG. 11 shows a schematic side view of a milling tool 1 according to FIG. 6, and FIG. 12 and FIG. 13 show an axial top view or a side view of the milling tool 1.

The schematic side view according to FIG. 11 characterizes a minimum profile diameter D of the machining head 3 which is defined by the milling cutter geometry at a predefined position along the axial direction of the machining head 3, in the example in FIG. 11 located in the region of the axial end of the machining head 3.

As can be seen in FIG. 11, at least one of the milling edge portions may be realized as a cutting tooth 19, realized in particular in a dome-shaped manner with reference to the operating axis of rotation 4. The ratio between the number of the cutting teeth 19 arranged consecutively per revolution in the circumferential direction with reference to the operating axis of rotation 4 and the minimum profile diameter D of the operating area 3 may be, for example, between 0.2 and 1.0.

The milling tools 1 proposed herein may be realized, as shown in FIG. 12 and FIG. 13, in such a manner that the separation angle or angles T and the angle or angles of twist, or the progression thereof, is chosen such that at least one milling tool sector 22 is present in which, when viewed in axial projection with reference to the operating axis of rotation 4 (see FIG. 12), are located a first cutting tooth 23 of a first milling edge 24 and a second cutting tooth 25 of a second milling edge 26, the first milling edge 24 being spaced from the second milling edge 26 in the circumferential direction U by at least one time the separation angle T, and the milling tool sector 22 covering a circumferential angle which is smaller than or equal to the separation angle T.

In the example in FIG. 12, the milling tool sector 22 corresponds to the separation angle T, it being possible in embodiments to realize the milling tool sector 22 so it is smaller than the separation angle T. For example, the milling tool sector may be between ⅓ and ½ of the separation angle.

It is shown overall that with the milling tool proposed herein, and the proposed production method, it is possible to provide a milling tool with which improved mechanical strength, comparatively high levels of surface quality and improved tool life are able to be achieved.

LIST OF REFERENCES

1 Milling tool
2 Shank
3 Machining head
4 Operating axis of rotation
5 Milling edge
5.1-5.4 Milling edge portion
6 Basic body
7 Chip space
8 Chip surface
9 Chip space base
10 Intersection line
10' Contour line
11 First leg
12 Second leg
13 Transition region
13.1 Transition region, first variant
13.2 Transition region, second variant
14 Free surface edge
15 Free surface
16 Outlet opening
17 Intersection point
18 Turning point
19 Cutting tooth
20 Cutting tooth flanks
21 Saddle-like projection
22 Milling tool sector
23 First cutting tooth
24 First milling edge
25 Second cutting tooth
26 Second milling edge
U Circumferential direction
R Operating direction of rotation
F Milling edge radius
T Separation angle
P Milling edge profile
L Axial length
G Radius of chip space base
H Height
B Width
S Chip space base profile
E Free surface width
D Minimum profile diameter
W1 Free surface angle
W2 Wedge angle
W3 Rake angle

We claim:
1. A milling tool, comprising:
an operating area for milling a workpiece, the operating area being rotatable about an operating axis of rotation and comprises at least one milling edge which extends transversely to a circumferential direction (U) of the operating axis of rotation, wherein:
at least one of the at least one milling edge includes at least one milling edge portion in which a milling edge profile (P), which is defined, along the milling edge, by a radial distance (F) between the milling edge and the operating axis of rotation, comprises a non-linear shape for generating on the workpiece a non-linear milling profile corresponding to the milling edge profile (P);
the milling edge in the milling edge portion has assigned thereto a chip space, which extends radially inward toward the operating axis of rotation in relation to the milling edge, and which extends upstream of the milling edge in the operating direction of rotation, is offset radially inwardly with respect to the milling edge in the form of a groove for receiving milling material generated during milling engagement;
the chip space comprising a chip space base defined as a line or surface extending in the chip space, which is at the smallest radial distance to the operating axis of rotation, and the chip space base extending parallel to the milling edge at least in portions in the milling edge portion with the non-linear milling edge profile (P);

at least one of the at least one milling edge is provided on a milling lug which extends transversely to the circumferential direction (U); and the milling lug, when measured in the circumferential direction (U), comprises a predefined width (E) which is substantially constant in the progression along the milling edge.

2. The milling tool as claimed in claim 1, wherein:
a chip surface extending, between the chip space base and the milling edge in the milling edge portion has, along the milling edge, a substantially constant width measured perpendicular to the milling edge.

3. The milling tool as claimed in claim 1, wherein
at least one milling edge includes multiple of the milling edge portions; and
the multiple milling edge portions are arranged along the respective milling edge one behind another.

4. The milling tool as claimed in claim 1, wherein:
the ratio between the number of milling edges arranged consecutively per revolution in the circumferential direction (U) with reference to the operating axis of rotation and a minimum diameter (D) of the operating area is between 0.2 and 1.0.

5. The milling tool as claimed in claim 4, wherein:
the separation angle (T) is selected such that, when viewing the milling tool in axial projection parallel to the operating axis of rotation, a first cutting tooth of a first milling edge and a second cutting tooth of a second milling edge overlap in a sector of the axial projection that covers a circumferential angle which is smaller than or equal to the separation angle (T);
the first milling edge is spaced from the second milling edge in the circumferential direction (U) by the separation angle (T).

6. The milling tool as claimed in claim 1, wherein:
the lug comprises a free surface extending from the at least one milling edge in a circumferential direction opposite to the operating direction of rotation (R) of the milling tool.

7. The milling tool as claimed in claim 6, wherein:
the free surface comprises a predefined width (E) measured perpendicular to the milling edge, which predefined width (E) is constant along the milling edge.

8. The milling tool as claimed in claim 6, wherein:
the free surface is slanted with reference to the circumferential direction (U) thereby realizing a predefined free surface angle (W1) which is substantially constant in the progression along the milling edge, wherein the free surface angle (W1) is within the range of between 0° and 15°.

9. The milling tool as claimed in claim 1, wherein:
the milling tool comprises multiple milling edges spaced apart in the circumferential direction (U) with reference to the operating axis of rotation, and milling edges following directly one after another in the circumferential direction (U) are arranged at a separation angle (T) within the range of between 8° and 120°.

10. The milling tool as claimed in claim 1, wherein:
the at least one milling edge extends helically twisted relative to the operating axis of rotation with an angle of twist lying in the range between 5° and 50°.

11. The milling tool as claimed in claim 1, wherein for at least one the milling tool has a rake angle (W3) within the range of between −3° and 24° and/or a wedge angle (W2) within the range of between 51° and 93°.

12. The milling tool as claimed in claim 1, wherein:
a milling edge profile (P) of the at least one milling edge;
corresponds to a fir tree profile; the fir tree profile including at least two peaks and/or troughs.

13. A milling tool comprising:
an operating area for milling a workpiece, the operating area being rotatable about an operating axis of rotation and comprises at least one milling edge which extends transversely to a circumferential direction (U) of the operating axis of rotation, wherein:
at least one of the at least one milling edge includes at least one milling edge portion in which a milling edge profile (P), which is defined, along the milling edge, by a radial distance (F) between the milling edge and the operating axis of rotation, comprises a non-linear shape for generating on the workpiece a non-linear milling profile corresponding to the milling edge profile (P);
the milling edge in the milling edge portion has assigned thereto a chip space, which extends radially inward toward the operating axis of rotation in relation to the milling edge, and which extends upstream of the milling edge in the operating direction of rotation, is offset radially inwardly with respect to the milling edge in the form of a groove for receiving milling material generated during milling engagement;
the chip space comprising a chip space base defined as a line or surface extending in the chip space, which is at the smallest radial distance to the operating axis of rotation, and the chip space base extending parallel to the milling edge at least in portions in the milling edge portion with the non-linear milling edge profile (P);
at least one of the at least one milling edge is provided on a milling lug which extends transversely to the circumferential direction (U); and
the milling lug, when measured in the circumferential direction (U), comprises a predefined width (E) which is substantially constant in the progression along the milling edge;
the milling tool comprising one or multiple shoulder segments between milling edges that are adjacent in the circumferential direction (U), wherein the contour of the shoulder segments follows the milling edge profile (P); and
each shoulder segment extends in the circumferential direction (U) with reference to the operating axis of rotation between a milling edge of a first milling lug and/or between a chip base assigned to the milling edge of the first milling lug and an edge of a free surface of a subsequent second milling lug in the operating direction of rotation (U), the free surface extending from the milling edge of the subsequent second milling lug in circumferential direction opposite direction to the operating direction of rotation (R) of the milling tool.

14. The milling tool as claimed in claim 13,
the milling tool has a pagoda-like form.

15. The milling tool as claimed in claim 13, including a basic body, wherein:
the basic body comprises multiple coolant and/or lubricant outlet openings.

16. The milling tool as claimed in claim 15, wherein:
the multiple coolant and/or lubricant outlet openings are oriented radially to the operating axis of rotation.

17. The milling tool as claimed in claim 15, wherein:
the outlet openings are arranged in each case at least in part between a milling edge and/or a chip space and a free surface edge connected upstream in the operating direction of rotation (R).

18. The milling tool as claimed in claim 15, wherein opening planes of the outlet openings, when viewed radially to the operating axis of rotation, lie at the same height or at least in part higher than the respectively assigned chip space base.

19. The milling tool as claimed in claim 15, wherein the coolant and/or lubricant outlet openings are located, inside the shoulder segments.

20. The milling tool as claimed in claim 15, wherein at least two of the coolant and/or lubricant outlet openings are arranged at radially different heights.

21. The milling tool as claimed in claim 1 or 13, wherein: the milling tool is at least one of an end mill, a finishing cutter, a fir tree cutter or bore milling cutter.

22. The milling tool as claimed in claim 1 or 13, wherein: multiple of the milling edge portions are formed as cutting teeth which are dome-shaped with reference to the operating axis of rotation.

23. The milling tool as claimed in claim 1 or 13, wherein: the ratio between the number of cutting teeth arranged consecutively per revolution in the circumferential direction (U) with reference to the operating axis of rotation and the minimum profile diameter (D) of the operating area is between 0.2 and 1.0.

24. The milling tool as claimed in claim 1 or 13, wherein the milling lug comprises a free surface extending from the milling edge in circumferential direction opposite to the operating direction of rotation (R) of the milling tool, and wherein an angle in circumferential direction between milling edges of adjacent milling lugs is between three and 20 times a circumferential angle spanned by the free surface.

* * * * *